US011480932B2

(12) United States Patent
Papadopoulos

(10) Patent No.: US 11,480,932 B2
(45) Date of Patent: Oct. 25, 2022

(54) SYSTEMS AND METHODS FOR APPLYING SEMANTIC INFORMATION TO DATA IN A BUILDING MANAGEMENT SYSTEM

(71) Applicant: Johnson Controls Technology Company, Auburn Hills, MI (US)

(72) Inventor: Dimitrios S. Papadopoulos, Westwood, NJ (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 572 days.

(21) Appl. No.: 16/598,635

(22) Filed: Oct. 10, 2019

(65) Prior Publication Data

US 2021/0109485 A1   Apr. 15, 2021

(51) Int. Cl.
| | | |
|---|---|---|
| *G06F 17/00* | (2019.01) | |
| *G05B 13/02* | (2006.01) | |
| *G06N 3/08* | (2006.01) | |
| *G06N 3/04* | (2006.01) | |
| *G06F 40/30* | (2020.01) | |

(52) U.S. Cl.
CPC ......... *G05B 13/027* (2013.01); *G06N 3/0454* (2013.01); *G06N 3/08* (2013.01); *G06F 40/30* (2020.01)

(58) Field of Classification Search
None
See application file for complete search history.

(56) References Cited

U.S. PATENT DOCUMENTS

| | | | |
|---|---|---|---|
| 9,703,276 B2 | 7/2017 | Piaskowski et al. | |
| 2017/0242413 A1 | 8/2017 | Piaskowski et al. | |
| 2019/0026359 A1 | 1/2019 | Park et al. | |
| 2019/0095519 A1 | 3/2019 | Park et al. | |
| 2020/0159173 A1* | 5/2020 | Goyal | G05B 13/0265 |
| 2020/0159182 A1* | 5/2020 | Goyal | G06F 16/248 |
| 2020/0159376 A1* | 5/2020 | Goyal | G05B 19/0426 |
| 2020/0159723 A1* | 5/2020 | Goyal | G06F 8/38 |

\* cited by examiner

*Primary Examiner* — Satwant K Singh
(74) *Attorney, Agent, or Firm* — Foley & Lardner LLP

(57) ABSTRACT

A method for applying semantic information to data in a building management system (BMS). The method includes receiving unrecognized data from equipment associated with the BMS, the unrecognized data comprising a first value and an associated device identifier; providing the unrecognized data as input to a first learning model to generate a first output, the first output indicative of semantic information corresponding to the first value evaluated individually; providing the unrecognized data as input to a second learning model to generate a second output, the second output indicative of semantic information corresponding to the first value evaluated in context of a second value associated with the device identifier; and applying semantic information to the unrecognized data based on the first output and the second output. The method allows for users to configure building management systems with automatically generated semantic data tags.

20 Claims, 12 Drawing Sheets

Historical Database

| ID | Values | Semantic Data Tag |
|---|---|---|
| GUID: 07u615248 | 179 | |
| GUID: 08u325627 | ON | Supply Fan Status |
| GUID: 01u213458 | 70 | Zone Temperature |
| GUID: 07u895642 | OFF | |
| GUID: 12u231754 | 85 | |
| GUID: 13u876521 | 47 | Chiller Water Supply Temperature |
| GUID: 89u456235 | 180 | Hot Water Supply temperature |
| GUID: 18u567894 | 250 | |

| Timestamp | Values | Semantic Data |
|---|---|---|
| | Time series | |
| 2015-12-31T23:10:00 | GUID: 09u243098<br>Value: 71.2 | Zone Air Temperature |
| 2015-12-31T23:20:00 | GUID: 09u243098<br>Value: 71.3 | Zone Air Temperature |
| 2015-12-31T23:30:00 | GUID: 09u243098<br>Value: 71.2 | Zone Air Temperature |
| 2015-12-31T23:40:00 | GUID: 09u243098<br>Value: 71.4 | Zone Air Temperature |
| 2015-12-31T23:50:00 | GUID: 09u243098<br>Value: 71.2 | Zone Air Temperature |
| 2016-01-01T00:00:00 | GUID: 09u243098<br>Value: 71.1 | Zone Air Temperature |
| 2016-01-01T00:10:00 | GUID: 09u243098<br>Value: 71.2 | Zone Air Temperature |
| 2016-01-01T00:20:00 | GUID: 09u243098<br>Value: 71.1 | |

FIG. 7

Time series 1A

| Timestamp | Values | Semantic Data |
|---|---|---|
| 2015-12-31T23:00:00 | GUID: 09u116895<br>Value: Off | Supply Fan Status |
| 2015-12-31T24:00:00 | GUID: 09u116895<br>Value: Off | Supply Fan Status |
| 2016-12-31T00:00:00 | GUID: 09u116895<br>Value: Off | Supply Fan Status |
| 2016-01-01T01:00:00 | GUID: 09u116895<br>Value: On | Supply Fan Status |
| 2016-01-01T02:00:00 | GUID: 09u116895<br>Value: On | Supply Fan Status |
| 2016-01-01T03:00:00 | GUID: 09u116895<br>Value: On | Supply Fan Status |
| 2016-01-01T04:00:00 | GUID: 09u116895<br>Value: On | Supply Fan Status |
| 2016-01-01T05:00:00 | GUID: 09u116895<br>Value: On | Supply Fan Status |

Time series 1B

| Timestamp | Values | Semantic Data |
|---|---|---|
| 2015-12-31T23:00:00 | GUID: 09u116895<br>Value: 66.70 | Discharge Air Temperature |
| 2015-12-31T24:00:00 | GUID: 09u116895<br>Value: 67.00 | Discharge Air Temperature |
| 2016-12-31T00:00:00 | GUID: 09u116895<br>Value: 69.20 | Discharge Air Temperature |
| 2016-01-01T01:00:00 | GUID: 09u116895<br>Value: 70.10 | Discharge Air Temperature |
| 2016-01-01T02:00:00 | GUID: 09u116895<br>Value: 68.5 | Discharge Air Temperature |
| 2016-01-01T03:00:00 | GUID: 09u116895<br>Value: 66.5 | Discharge Air Temperature |
| 2016-01-01T04:00:00 | GUID: 09u116895<br>Value: 63.2 | Discharge Air Temperature |
| 2016-01-01T05:00:00 | GUID: 09u116895<br>Value: 59.50 | Discharge Air Temperature |

FIG. 8

SYSTEMS AND METHODS FOR APPLYING SEMANTIC INFORMATION TO DATA IN A BUILDING MANAGEMENT SYSTEM

BACKGROUND

The present disclosure relates generally to the field of building management systems. A building management system (BMS) is, in general, a system of devices configured to control, monitor, and manage equipment in or around a building or building area. A BMS can include, for example, an HVAC system, a security system, a lighting system, a fire alerting system, another system capable of managing building functions or devices, or any combination thereof.

Building management systems, especially upon installation, may be responsible for managing data that is not properly described or identified. The data can be provided by various sensors associated with different devices and/or spaces of a building that generate and send data to the BMS. Building equipment installed in any given building may include older, legacy equipment and equipment that communicates using various protocols. As a result, data received from this equipment may include values without units, missing or incomplete device or space identifiers, and other ambiguities. Consequently, the data can appear as gibberish to both the BMS and to administrators viewing the data and attempting to identify characteristics of the BMS. During commissioning of the BMS, subject matter experts may be required to manually sort through this data and apply semantic information such as semantic data tags. This process may require significant time and effort in addition to subject matter expertise. Systems and methods that could make this process more accurate and efficient are generally desired.

SUMMARY

In one implementation of the present disclosure, a method for applying semantic information to data in a building management system (BMS) is provided. The method includes receiving unrecognized data from equipment associated with the BMS, the unrecognized data including a first value and an associated device identifier; providing the unrecognized data as input to a first learning model to generate a first output, the first output indicative of semantic information corresponding to the first value evaluated individually; providing the unrecognized data as input to a second learning model to generate a second output, the second output indicative of semantic information corresponding to the first value evaluated in context of a second value associated with the device identifier; and applying semantic information to the unrecognized data based on the first output and the second output.

In some embodiments, applying the semantic information to the unrecognized data includes applying a tag to the first value in accordance with Brick Schema or Project Haystack.

In some embodiments, applying the semantic information to the unrecognized data includes creating an entity associated with the equipment and connecting the entity to a directed graph.

In some embodiments, applying the semantic information to the unrecognized data includes generating a BACnet object associated with the equipment and writing the first value to an attribute of the BACnet object.

In some embodiments, presenting a user interface to a user of the BMS that allows the user to confirm the semantic information before applying the semantic information to the unrecognized data.

In some embodiments, updating an equipment model associated with the equipment in the BMS using the semantic information and the first value.

In some embodiments, the method further includes generating a first training dataset using historical data associated with the BMS, the first training dataset including time series with corresponding semantic information; and training the first learning model using the first training dataset.

In some embodiments, the method further includes generating a second training dataset using historical data associated with the BMS, the second training dataset including related time series with corresponding semantic information; and training the second learning model using the second training dataset.

In some embodiments, at least one of the first output and the second output includes a probability distribution of semantic data tags to apply to the unrecognized data.

In some embodiments, the method further includes evaluating the unrecognized data according to a set of rules to generate a third output and applying the semantic information to the unrecognized data based on the third output.

In some embodiments, the method further includes aggregating the first output, the second output, and the third output to obtain an aggregated value and comparing the aggregated value to a predetermined threshold.

In another implementation of the present disclosure, a building management system (BMS) is described. The building management system includes one or more computer-readable storage media having instructions stored thereon that, when executed by one or more processors, cause the one or more processors to: receive unrecognized data from equipment associated with the BMS, the unrecognized data including a first value and an associated device or object identifier; provide the unrecognized data as input to a first learning model to generate a first output, the first output indicative of semantic information corresponding to the first value evaluated individually; provide the unrecognized data as input to a second learning model to generate a second output, the second output indicative of semantic information corresponding to the first value evaluated in context with a second value associated with the device identifier; and apply semantic information to the unrecognized data based on the first output and the second output.

In some embodiments, the one or more processors evaluate the unrecognized data according to a set of rules to generate a third output and apply the semantic information to the unrecognized data based on the third output.

In some embodiments, the one or more processors aggregate the first output, the second output, and the third output to obtain an aggregated value and compare the aggregated value to a predetermined threshold.

In some embodiments, the one or more processors apply the semantic information to the unrecognized data by applying a tag to the first value in accordance with Brick Schema or Project Haystack.

In some embodiments, the one or more processors apply the semantic information to the unrecognized data by creating an entity associated with the equipment and connecting the entity to a directed graph.

In some embodiments, the one or more processors apply the semantic information to the unrecognized data by generating a BACnet object associated with the equipment and writing the first value to an attribute of the BACnet object.

In some embodiments, the one or more processors present a user interface to a user of the BMS that allows the user to confirm the semantic information before applying the semantic information to the unrecognized data.

In some embodiments, the one or more processors update an equipment model associated with the equipment in the BMS using the semantic information and the first value.

In another implementation of the present disclosure, a method for applying semantic information to data in a building management system (BMS) is provided. The method includes receiving unrecognized data from equipment associated with the BMS, the unrecognized data including a first value; providing the unrecognized data as input to a first learning model to generate a first output, the first output indicative of semantic information corresponding to the first value evaluated individually; evaluating the unrecognized data according to a set of rules to generate a second output; and applying semantic information to the unrecognized data based on the first output and the second output.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 6 is a table showing an example of historical data in a database associated with the semantic application system of FIG. 5, according to some embodiments.

FIG. 7 is a table showing an example of time series data in a training dataset associated with the semantic application system of FIG. 5, according to some embodiments.

FIG. 8 is a table showing another example of data in a training dataset associated with the semantic application system of FIG. 5, according to some embodiments.

DETAILED DESCRIPTION

Overview

Figure 1:
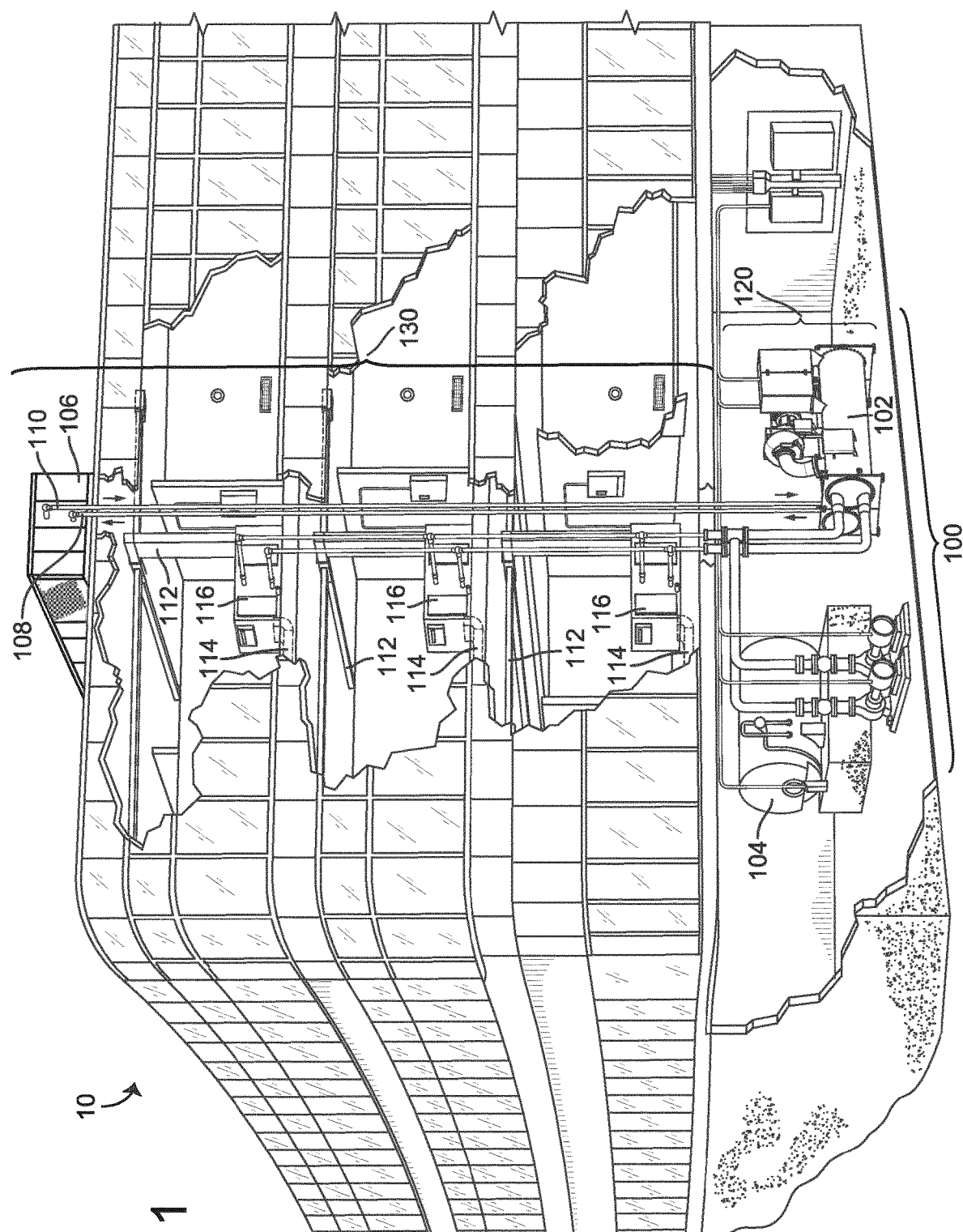
FIG. 1 is a drawing of a building equipped with a heating, ventilating, and/or air conditioning (HVAC) system and a building management system (BMS), according to some embodiments.

Referring generally to the FIGURES, systems and methods for generating semantic data tags to apply to data associated with a building management system using machine learning and rule-based models are shown, according to various embodiments. In some previous approaches, subject matter experts may be required to manually apply semantic data tags to building data. This manual process can be time consuming and typically requires expertise in the field of building management systems in order to properly tag data. In some previous approaches, application of semantic information to building data may rely solely on a static, rule-based model. The rule-based model may include thresholds and ranges determined by administrators based on common characteristics of similar data. The systems may apply the thresholds and ranges to data received from a building network and generate semantic data tags based on whether the data satisfies a specific threshold or range. In some instances, data received by systems using methods not described herein may not satisfy a specific threshold or range of any rules and the systems either discard the data or store the data without adding any semantic data tags to it. Because data can include errors or include values outside of a range that an administrator may consider normal, the use of only a rule-based model may lead to the system improperly generating and applying semantic data tags to the data or not applying semantic data tags to the data at all.

In contrast, the systems and methods described herein can receive the data and use the data as inputs into one or more machine learning models and/or rule-based models to generate semantic data tags. The systems can use a machine learning model (e.g., a neural network, Random forest, support vector machine, etc.) that evaluates a time series for a point (e.g., temperature of a space of a room, discharge air temperature of an air handling unit, etc.), a machine learning model that evaluates patterns of multiple related time series (e.g., values from different sensors associated with a chiller, air handling unit, hallways, conference rooms, or any other building device or space), and a rule-based model that uses rules determined by administrators to generate the semantic data tags. This three-pronged approach to applying sematic information to building data can provide more dynamic and accurate performance in addition to reducing the need for manual work when compared to some previous approaches. The systems can obtain probability distributions of semantic data tags from each model and generate semantic data tags based on the probability distributions. In some embodiments, the systems can generate semantic data tags for data if the probability of the semantic data tag exceeds a threshold associated with each model. The systems may apply different rules to the probabilities to account for a probability outlier from a particular model (e.g., a high probability output from two models but a relatively low probability output from a third model).

The machine learning models may be trained using supervised and unsupervised methods. The machine learning models may be trained using historical data stored in a database of a building management system. The historical data may include data points that have been labeled with semantic data tags and data points that have not been labeled with semantic data tags. An administrator may identify the output and label the output as correct or incorrect before the machine learning model backward propagates the output for further training. As each machine learning model receives more data each machine learning model can be more accurate in future predictions or outputs.

Advantageously, by using a combination of the machine learning and rule-based models, the systems described herein can obtain a more accurate probability of proper semantic data tags to apply to a data point or a set of data (e.g., a data time series). Data in a time series may be abnormal for a particular point, so implementing the data in the time series into a single machine learning model dedicated to identifying semantic data probabilities based on data from a single time series might result in a faulty output. By applying the data in the time series to the multiple machine learning models and to a rule-based model and comparing the outputs of the models, the systems can obtain a more accurate probability for proper semantic data tags to apply to the data.

Further, the aspects described herein may increase the utility of the data received from building management systems and can be used in varying types of building management systems. Because machine learning models can be trained based on data specific to particular building management systems, the aspects described herein can be applied to all types of building management systems so the systems can generate and apply semantic data tags to data without the need of costly manual configuration and data entry. The systems can receive the data, generate semantic data tags indicating a state of different devices and spaces of a building management system, and control building devices based on the semantic data tags. For instance, as a result of the aspects described herein, a system can receive purely numerical data from sensors of a building system. The sensors may not have been configured to include metadata in the numerical data indicating what measurements or device the numerical data is associated with. By implementing the aspects described with the machine learning and rule-based models, the system can apply the data to the models and generate semantic data tags to apply to the data. Consequently, a user can view the data and understand its meaning. Further, the system can organize and use the data for automation and control of building equipment, display the data in a visual display, create customized reports including the data, and enable easier system navigation as users access the building management system.

Building Management System and HVAC System

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., boilers, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve set point conditions for the building zone.

Figure 2:
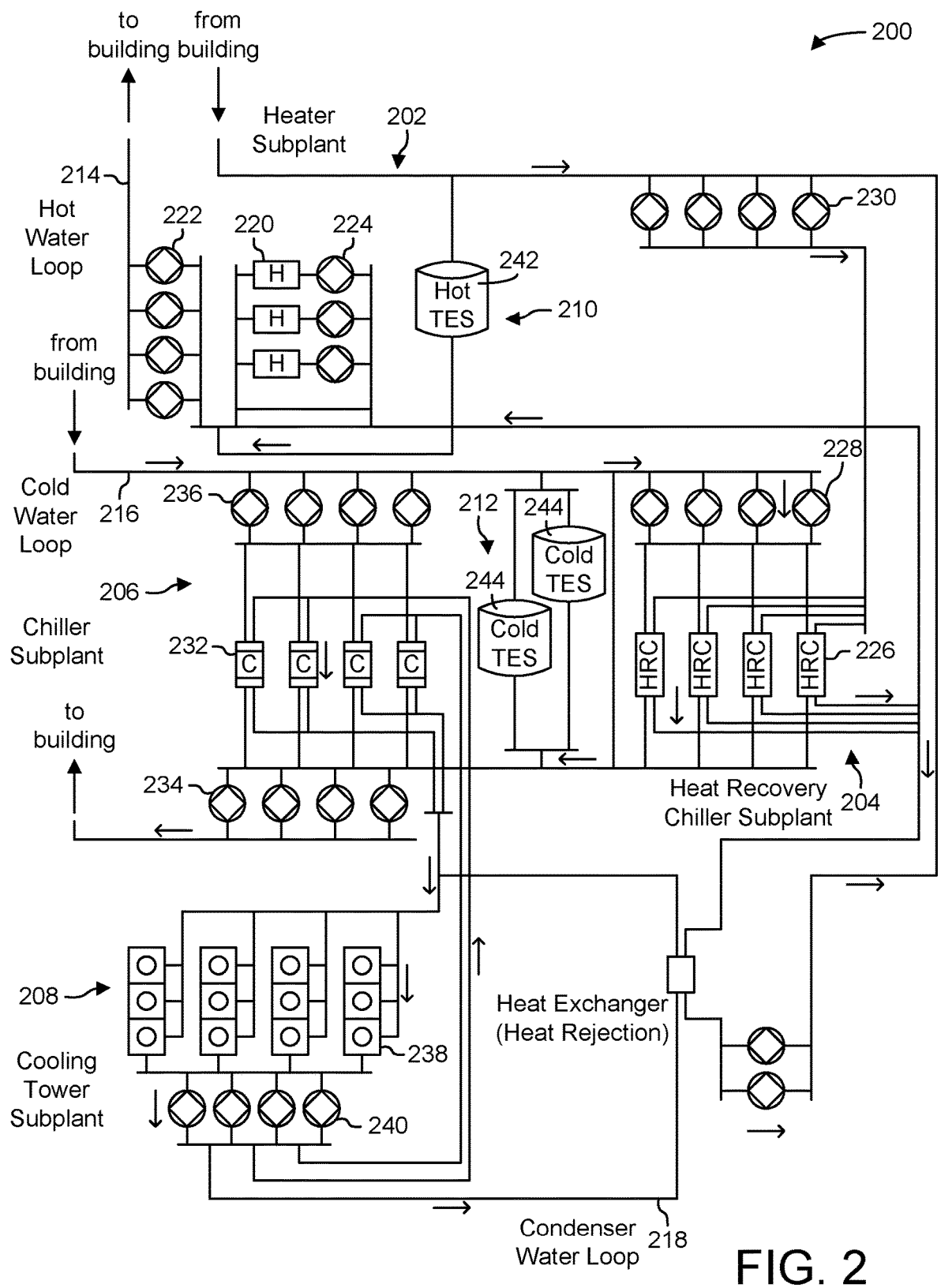
FIG. 2 is a schematic diagram of a waterside system which may be used to support the HVAC system of FIG. 1, according to some embodiments.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
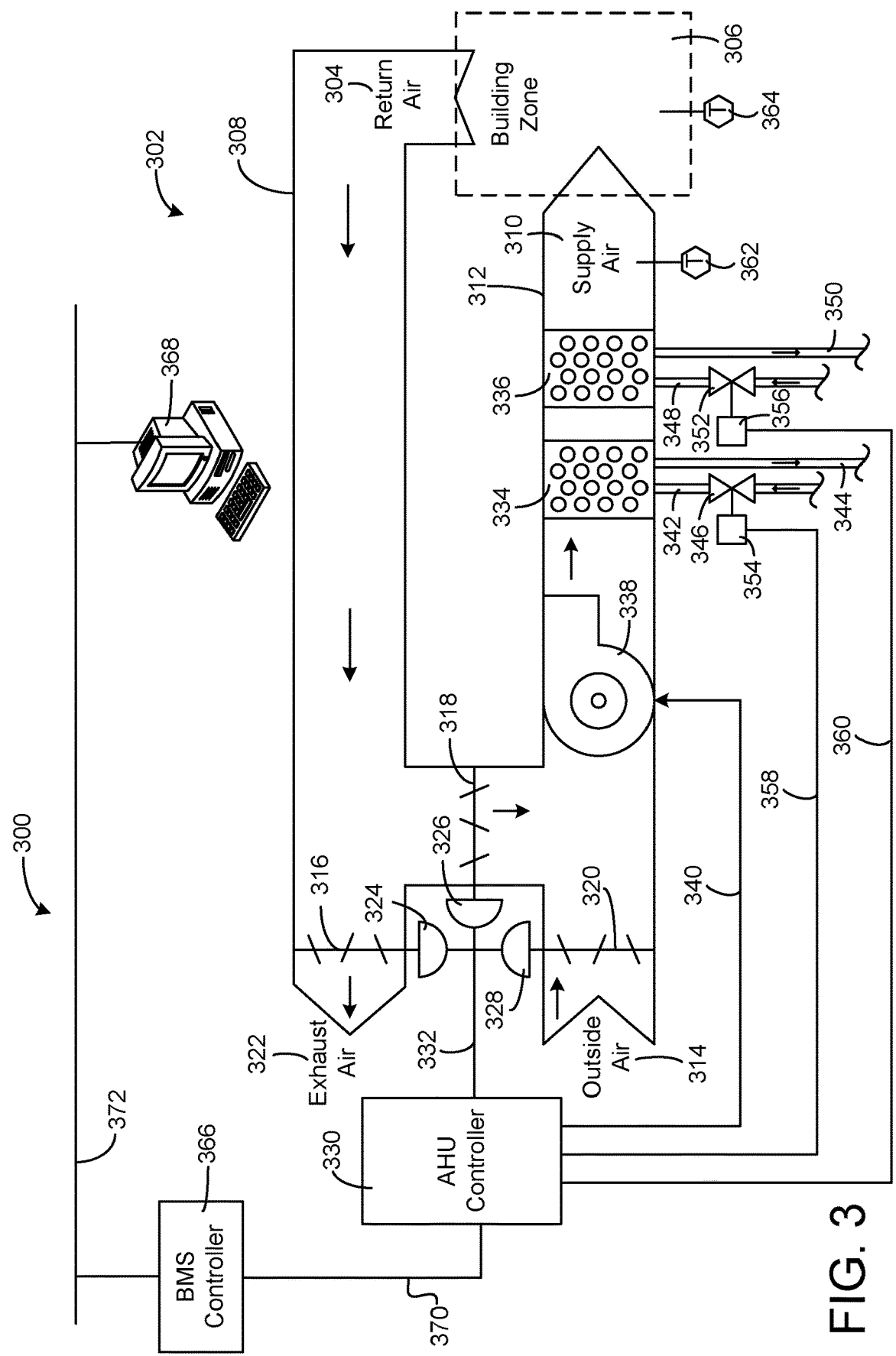
FIG. 3 is a block diagram of an airside system which may be used as part of the HVAC system of FIG. 1, according to some embodiments.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type AHU 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a BMS controller 366 and a client device 368. BMS controller 366 may include one or more computer systems (e.g., servers, supervisory controllers, subsystem controllers, etc.) that serve as system-level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
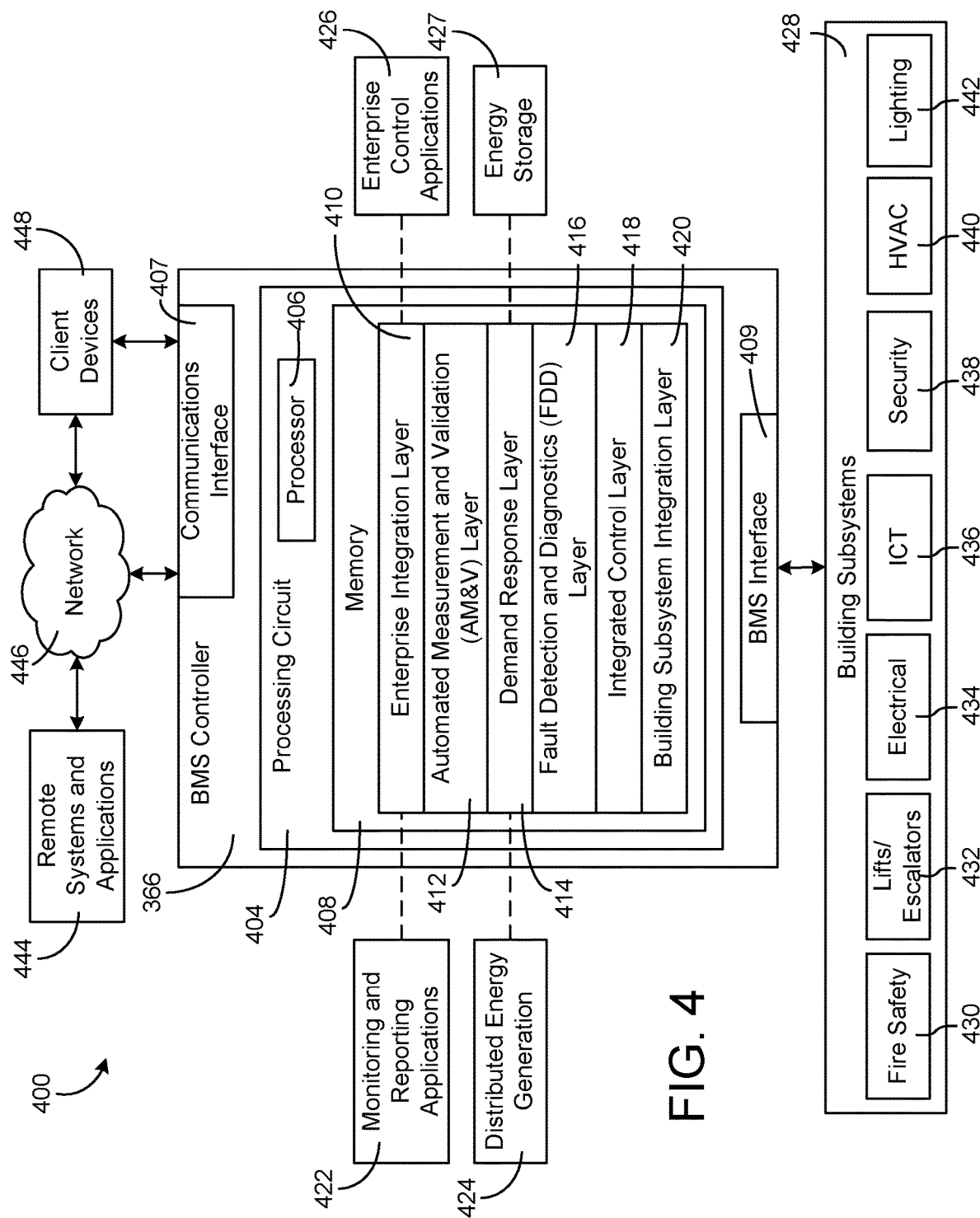
FIG. 4 is a block diagram of a BMS which may be implemented in the building of FIG. 1, according to some embodiments.

Referring now to FIG. 4, a block diagram of a BMS 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include any number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407 and 409 may be or may include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407 and 409 may be direct (e.g., local wired or wireless communications) or via a communications network 446 (e.g., a WAN, the Internet, a cellular network, etc.). For example, interfaces 407 and 409 may include an Ethernet card and port for sending and receiving data via an Ethernet-based communications link or network. In another example, interfaces 407 and 409 may include a WiFi transceiver for communicating via a wireless communications network. In another example, one or both of interfaces 407 and 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407 and 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments, BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Building Management System with Semantic Data Tagging

Figure 5:
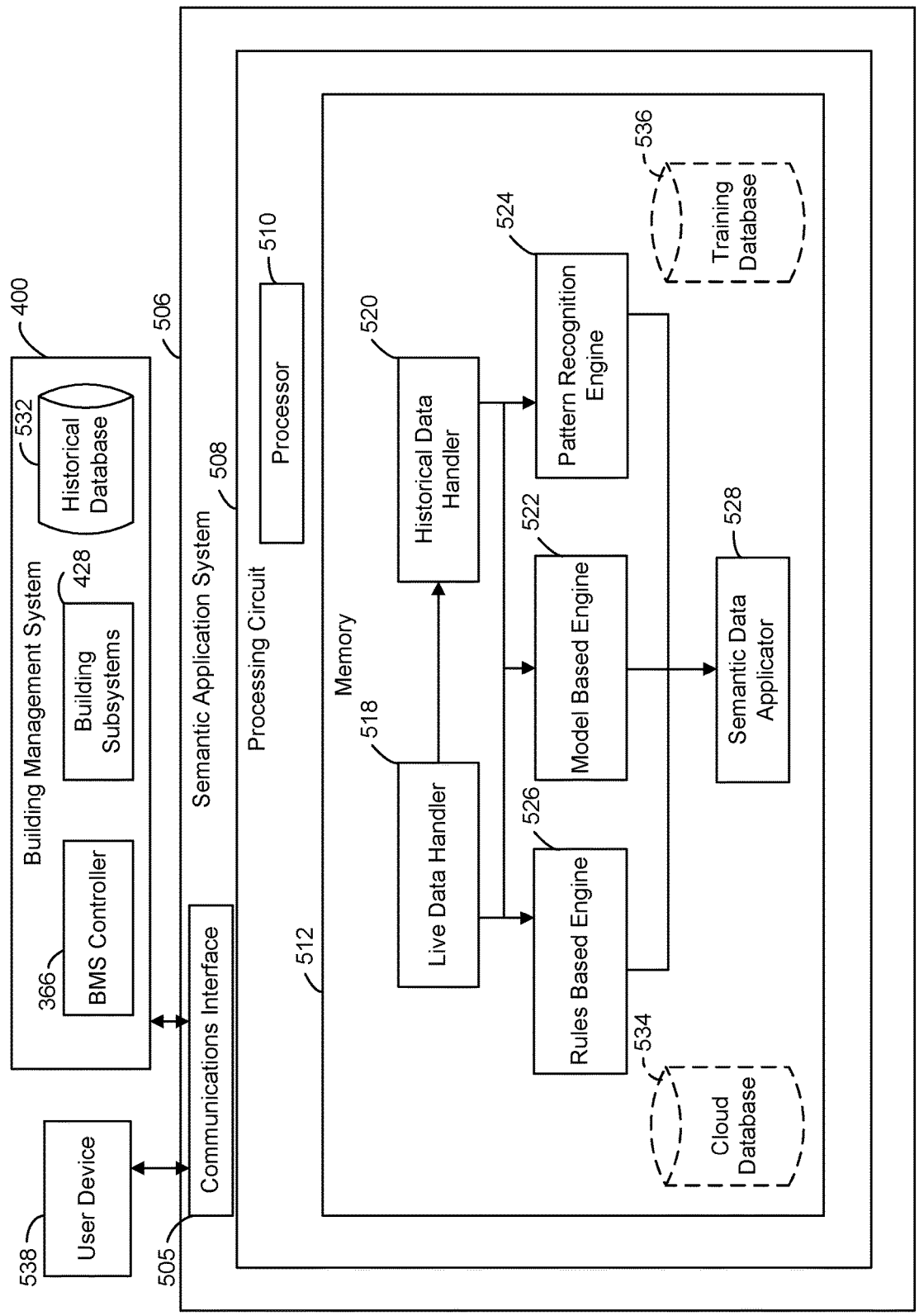
FIG. 5 is a block diagram of an example semantic application system associated with the BMS of FIG. 4, according to some embodiments.

Referring now to FIG. 5, a block diagram of a semantic application system 506 associated with building management system 400 with a historical database 532 stored in building management system 400 is shown, according to some embodiments. Semantic application system 506 can generally be configured to receive and identify building data from building equipment associated with building management system 400 and apply semantic information (e.g., semantic data tags) to the individual values of the building data. As described herein, semantic application system 506 may be connected or applied to a new building management system to automatically generate and apply semantic data tags to values of data of the new building management system so a controller can process the data while administrators can view and understand it. The semantic data tags may indicate a software class associated with the building device and/or point that is associated with building management system 400.

Building management system 400 may include historical database 532. Historical database 532 can be configured to store building data associated with BMS 400. Historical database 532 can be a graph database, MySQL, Oracle, Microsoft SQL, PostgreSql, DB2, document store, search engine, device identifier-value store, etc. Historical database 532 can be configured to hold data including any amount of values and can be made up of any number of components. The data can include various measurements and states (e.g., temperature readings, pressure readings, device state readings, blade speeds, etc.) associated with building equipment (e.g., AHUs, chillers, boilers, VAVs, fans, etc.) of each subsystem of building subsystems 428. In some embodiments, the building data is tagged with timestamps indicating times and dates that the values of the building data were generated by devices of building subsystems 428 and/or collected by various components of building management system 400.

Historical database 532 can include data that has been tagged with semantic data tags describing different characteristics of the data (e.g., device type, device identifier, space, etc.). Historical database 532 may also house control type control strategies, relationships, etc., of building devices within building management system 400. Devices or sensors associated with the devices of building subsystems 428 may generate the data. Semantic data tags can be generated and applied to the data by semantic application system 506. Semantic application system 506 may tag the data by applying the processes described herein. Historical database 532 can also include unrecognized data received from building management system 400. Unrecognized data may be untagged live and/or historical data received from building equipment of building subsystems 428. The unrecognized data may not have semantic data tags associated with any of or a portion of the data points of the unrecognized data.

By storing data of historical database 532 in building management system 400, all or a portion of the data of building management system 400 may be used as training data for training machine learning models of semantic application system 506 to generate semantic data tags as discussed below. The machine learning models of semantic application system 506 may be trained by data that is specific to building management system 400. Consequently, semantic application system 506 may more accurately generate semantic data tags that are specific to building management system 400.

Semantic application system 506 is shown to include a processing circuit 508 that includes a processor 510 and a memory 512. Memory 512 can include instructions which, when executed by processor 510, cause processor 510 to perform the one or more functions described herein. Each of the processes and services conducted by semantic application system 506 can also be conducted by BMS controller 366 and/or other similar components. For example, semantic application system 506 may generally be implemented using one or more servers associated with BMS 400. The one or more servers may be remote servers (cloud), local servers (on-premises), or any combination thereof. Processor 510 as described herein may be implemented using one or more processors or processing devices such as a tensor processing unit (TPU) designed for using machine learning techniques to determine probabilities that different semantic data tags can be applied to unrecognized data associated with BMS 400.

Memory 512 can be configured to store instructions executable by control circuitry and/or other data (e.g., data pertaining to communication, configuration and/or address data of nodes, etc.). Processing circuit 508 can be configured to implement any of the methods described herein and/or to cause such methods to be performed by a processor (e.g., processor 510). Memory 512 is shown to include a live data handler 518, a historical data handler 520, a model-based engine 522, a pattern recognition engine 524, a rule-based engine 526, and a semantic data applicator 528. Memory 512 also includes a cloud database 534 and/or a training database 536, in some embodiments. Memory 512 can include any number of components and/or modules. Processing circuit 508 can implement any of components 518-528 to receive live and/or historical building data with and/or without semantic data tags indicating different aspects of the building data as related to building management system 400. Processing circuit 508 may tag the data with semantic data tags. It may be considered that processing circuit 508 includes or may be connected or connectable to memory 512, which may be configured to be accessible for reading and/or writing by controller 366 and/or processing circuit 508. Further, components 518-528 of memory 512 can communicate with a user device 538 to receive and transmit data. User device 538 can be the same or similar to client devices 368 as described with reference to FIG. 3.

Semantic application system 506 is shown to include a communications interface 505. Communications interface 505 can be configured to facilitate communication with any device. Furthermore, communications interface 505 can be configured to securely communicate with all of the devices and systems described with reference to FIG. 3. In various embodiments, communications via communications interface 505 can be direct (e.g., local wired or wireless communications) or via a communications network (e.g., a WAN, the Internet, a cellular network, etc.).

In some implementations cloud database 534 may be a cloud database that collects and stores building data from subsystems 428 of building management system 400 that is similar to the data of historical database 532. Cloud database 534 may also collect and store various other types of data (e.g., weather data, utility consumption data, spatial information, facility mappings, etc.) that is associated with building management system 400. Data of cloud database 534 may be encrypted to protect the data from malicious entities. Advantageously, cloud database 534 may offer users a more expansive view of how building management system 400 operates under various conditions that may not be visible when only building data is available. Further, cloud database 534 may back up the data of historical database 532 in case such data is removed from historical database 532.

In some implementations, training database 536 may be a cloud database that is in communication with subsystems 428 of building management system 400 and with subsystems of other building management systems. Training database 536 may collect and store building data that is similar to cloud database 534 from each of the building management systems. The building data of training database 536 may include tagged and untagged values of time series similar to the building data of historical database 532. By collecting and storing building data from multiple building management systems, training database 536 may enable users viewing the building data through a user interface to compare data of different building management systems and gain insights into how each building management system is operating and/or how each building management system could be operating. Further, training database 536 may also unify metadata management of the building systems so building components and relationships of the building components can be described using consistent descriptions across different building management systems. For example, data of a temperature sensor that collects data associated with the outside air temperature of a building system may be tagged as an "OAT-Sensor" in training database 536. Data from outside air temperature sensors of other building management systems that provide data to training database 536 may be similarly tagged. Such data may be used as training data so the machine learning models of semantic application system 506 may accurately determine semantic data tags to unlabeled values.

Advantageously, because training database 536 includes semantic data tags that are similar across building management systems, machine learning models of each building management system may be trained to generate similar semantic data tags for unrecognized data. The machine learning models can be trained using data from any of the building management systems that provide data to training database 536 because the data includes consistent descriptions of building components (e.g., building devices) and relationships between the building components across each building management system. Thus, the machine learning models may be trained using a large amount of data, causing the machine learning models to be more accurate and be trained more quickly than if the machine learning models were trained only using data specific to one building management system. Further, users viewing the data and comparing data between the building management systems may more easily gain insights into the data because the data has consistent labels. The user may not have to match values with different labels between building management systems even if the values describe similar components, points, or relationships.

Live data handler 518 can be configured to retrieve and/or collect building data from building management system 400 and store the building data in historical database 532 of building management system 400, in some embodiments. Live data handler 518 can be configured to collect data automatically from building management system 400 and store the data in historical database 532. In some embodiments, live data handler 518 is configured to poll building management system 400 to collect data at predetermined time intervals set by an administrator. Live data handler 518 can further be configured to collect data upon detecting that a value changed by an amount exceeding a threshold. In some embodiments, live data handler 518 is configured to collect building data upon receiving a request from an administrator. The administrator may make the request from a user device, such as user device 538. The administrator can request building data associated with any time period and building device. In some embodiments, live data handler 518 may collect the data and transmit the data to historical data handler 520 to be stored in historical database 532.

Live data handler 518 can be configured to tag each data point of the data with timestamps indicating when the data point was generated and/or when live data handler 518 collected the data point from building management system 400 or building subsystems 428. In some embodiments, live data handler 518 can also tag the data with a device identifier tag indicating which building device the building data was collected from.

Live data handler 518 can be configured to receive data from building management system 400 and/or devices of building subsystems 428, check the data for errors, and transfer the data to components 522-526 so components 522-526 can generate probability distributions for potential semantic data tags to associate with the building data. The data can be associated with one or more points (e.g., specific characteristics of building management system 400) over different time periods. Live data handler 518 can transmit the data to each of model-based engine 522, pattern recognition engine 524, and rule-based engine 526 to be processed before semantic data applicator 528 generates semantic data tags to associate with the building data.

Live data handler 518 can be configured to analyze data received from building subsystems 428 of building management system 400 to identify any errors in the data. Errors may occur at the bit level resulting from a faulty transmission (e.g., a bad read or write) between building management system 400 and components of semantic application system 506 or during transmission between any components of building management system 400. Errors may also result from faulty sensors of devices of building subsystems 428 that provide data to live data handler 518. Live data handler 518 can identify the errors and discard the faulty data. In some embodiments, live data handler 518 can send an error message to user device 538 indicating that there is an error in the data and a device associated with the error may require attention from an administrator.

In some instances, live data handler 518 can identify errors in the data based on whether the data is within a predetermined range of values. If the data includes values outside of the predetermined range of values, live data handler 518 can determine that there is an error in the data and discard a portion of the data including the error or the dataset that the error is included in. The predetermined ranges can be determined by an administrator and can be particular to different devices and/or measurements. For example, live data handler 518 may receive data associated with the temperature of a conference room. An administrator may have determined that any data indicating that the temperature of the conference room is outside of a range from 60 to 80 degrees is received or generated in error and should be discarded. Live data handler 518 can identify the range determined by the administrator and discard any data points that lie outside of the 60 to 80-degree range.

Advantageously, by discarding data that was likely received or generated in error, semantic application system 506 may not waste processing power generating semantic data tags for the faulty data. Further, the faulty data may not impact the outputs or any training of the machine learning models of model-based engine 522 and pattern recognition engine 524 so model-based engine 522 and pattern recognition engine 524 can more accurately determine which semantic data tags to apply to data received from building management system 400. By discarding the faulty data, the faulty data may not impact the learning of the machine learning models because the machine learning models may not receive the faulty data if it is discarded. Live data handler 518 can transmit the data without any errors to model-based engine 522, pattern recognition engine 524, and rule-based engine 526 to determine which semantic data tags to apply to the data.

Live data handler 518 can transmit time series data (e.g., time series generated by sensors of building management system 400 that has not been stored in historical database 532) to each of model-based engine 522, pattern recognition engine 524, and rule-based engine 526. In some embodiments, live data handler 518 can transmit the same time series to each of model-based engine 522, pattern recognition engine 524 and rule-based engine 526. Time series can be a collection of values for a particular data point (e.g., a discharge air temperature point of an air handling unit) generated at different times (e.g., at periodic intervals). The values may include or be associated with identifiers of the building devices that the data points are associated with (e.g., an air handler, a controller, a chiller, etc.). In some instances, live data handler 518 may transmit sets of values that are not associated with timestamps and/or device identifiers to each of components 522-526. Advantageously, by transmitting data to model-based engine 522, pattern recognition engine 524, and rule-based engine 526 directly after live data handler 518 receives the live data, the components of semantic application system 506 can ensure that any new data that building management system 400 stores in historical database 532 is accurately tagged and meaningful.

Semantic application system 506 is shown to include historical data handler 520. In some embodiments, historical data handler 520 is configured to retrieve data from historical database 532 so components 522-528 of semantic application system 506 can automatically generate and apply semantic data tags to the data to update historical database 532. Historical data handler 520 can retrieve the data from historical database 532 and check for errors in a similar manner to how live data handler 518 may check for errors in live data received from building equipment. Historical data handler 520 can also generate and update training datasets using data from historical database 532 to train the machine learning models of model-based engine 522 and/or pattern recognition engine 524.

Historical data handler 520 can transmit time series data or other sets of values to each of model-based engine 522, pattern recognition engine 524, and rule-based engine 526 that are already stored in historical database 532. In some instances, historical database 532 may include data (e.g., values) that has not been tagged with a semantic data tag. Historical data handler 520 can parse through historical database 532 to identify time series without a semantic data tag. Historical data handler 520 can identify the time series or individual values without the tag and transmit the time series or individual value to each of model-based engine 522, pattern recognition engine 524, and rule-based engine 526. Further, in some embodiments, historical data handler 520 can identify and transmit time series in historical database 532 that have already been tagged to train the machine learning models of model-based engine 522 and/or pattern recognition engine 524.

For each of live data handler 518 and historical data handler 520 to transmit time series data or values to model-based engine 522 and/or pattern recognition engine 524, live data handler 518 and historical data handler 520 may process the time series data into a form that can be used as an input into model-based engine 522 and/or pattern recognition engine 524. For example, historical data handler 520 may generate a feature vector from data in historical database 532 that can be used as an input into model-based engine 522 and/or pattern recognition engine 524. The feature vector may include numerical identifiers for the data. The numerical identifiers may be the values of the data. In some embodiments, the values of the data is divided and grouped based on the device the values are associated with. In some embodiments, the values of on or off may be a binary where on is represented by a one and off is represented by a zero. In some instances, the feature vector may be a binary vector. Historical data handler 520 may also include identifiers of the timestamps associated with the values in the feature vector. Live data handler 518 may generate the feature vector in a similar manner. Historical data handler 520 and live data handler 518 may generate the feature vector in any manner and to have any form. As described herein, when live data handler 518 and/or historical data handler 520 provide time series, training or otherwise to each of model-based engine 522, pattern recognition engine 524, and/or rule-based engine 526, they may be providing a feature vector or data in some other machine recognizable format to the respective component.

In some embodiments, historical data handler 520 is configured to generate training datasets to apply to the machine learning models of model-based engine 522 and/or pattern recognition engine 524. Historical data handler 520 can apply the training datasets so the machine learning models can more accurately predict probabilities for semantic data tags to apply to values of live data collected from building management system 400 and/or historical data stored in historical database 532. Historical data handler 520 can apply any number of datasets to the training models. Each dataset can have any number of data points. The values of the data points may be associated with an identifier (e.g., a device identifier, a time series identifier, a MAC address, an IP address, etc.) In some instances, the more datasets and/or the larger the datasets that historical data handler 520 generates, the more accurate the machine learning models.

In some embodiments, historical data handler 520 can generate training datasets from historical data stored in historical database 532. Historical data handler 520 can retrieve the data from historical database 532 and aggregate the data into lists to use as inputs into the machine learning models of model-based engine 522 and pattern recognition engine 524. As described above, data stored in historical database 532 may include data that has already been tagged with a semantic data tag and unrecognized data (e.g., data that has not been tagged). In some embodiments, historical data handler 520 may use data from a cloud database that includes data from other building management systems to generate all or a portion of the training datasets. Historical data handler 520 can generate training datasets that provide supervised learning with data tagged with semantic data and unsupervised learning with non-tagged data to the machine learning models. In some embodiments, historical data handler 520 can generate training datasets that include a mixture of data points that have been tagged and data points that have not been tagged with semantic data tags (e.g., semi-supervised learning).

For example, historical database 532 can store data received from sensors of a supply fan of an air handling unit of building management system 400. The data may include a time series with values indicating whether the supply fan is 'On' or 'Off' and another time series with values of a discharge air temperature of the air handling unit (e.g., 54.32, 55.43, 56.00, 54.00). Some of the data may be tagged with semantic data tags indicating what the values are (e.g., Supply Fan Status, Discharge Air Temperature, etc.) and other data may only include the values. In some instances, the values are associated with device identifiers (or other identifiers) identifying devices that the values are associated with. Historical data handler 520 can retrieve the data from historical database 532 and generate a list of the data as a training dataset to input into model-based engine 522 and pattern recognition engine 524 to train the machine learning models of each component.

In some embodiments, historical data handler 520 can generate training datasets specific to each machine learning model. Historical data handler 520 can generate a training dataset to input into model-based engine 522 and another training dataset to input into pattern recognition engine 524. The training dataset for model-based engine 522 can include values of a time series of a point associated with a device or space. Each value can be associated with a timestamp indicating the date and time that the value was generated by an associated sensor or collected by semantic application system 506. Continuing with the above example, historical data handler 520 may generate a training dataset for model-based engine 522 by including values of the discharge air temperature of the supply fan and excluding time series with values indicating the status of the supply fan or any other time series associated with the supply fan. The training dataset generated for model-based engine 522 can include any number of time series.

Using the generated training datasets, historical data handler 520 can train model-based engine 522 to individually evaluate values of time series or sets of values. Historical data handler 520 may train model-based engine 522 to receive an input including a set of values including any amount of associated data (e.g., some values may only be associated with an identifier, some values may only be associated with a timestamp, and some values may not be associated with an identifier or a timestamp). Model-based engine 522 may be trained to evaluate each value individually using model parameters or weights and generate a semantic data tag to apply to the value. For example, model-based engine 522 may receive a set of values of the following form:

[<GUID: 07u615124, 70.1>, <GUID: 07u615124, 70.4>, <GUID: 07u615124, 70.3>]

The values of 70.1, 70.4, and 70.3 may each be associated with a device identifier of 07u615124. Model-based engine 522 may be trained to use model parameters or weights on each value using the other values of the set of values and, in some cases, the device identifier as inputs to generate a semantic data tag for each value. In the example above, model-based engine 522 may generate a semantic data tag indicating that each value is associated with a zone air temperature. Model-based engine 522 may be trained to handle values associated with any amount of data.

Historical data handler 520 can also generate and apply training datasets to pattern recognition engine 524. Training datasets for pattern recognition engine 524 may include multiple time series with related values or time series. The time series (or values of the time series) can be related if they are associated with the same device, characteristic (e.g., air temperature, discharge air temperature, pressure, etc.), or space, among other possible relationships. Historical data handler 520 can determine if time series are related based on matching device identifiers between the time series and/or matching timestamps of the values. Each data point of the time series may be associated with a timestamp similar to the timestamps of the training datasets for model-based engine 522. In some instances, the data points of each related time series may be associated with timestamps common to data points of one or more of the related time series (e.g., a data point indicating the discharge air temperature of an air handling unit may have the same timestamp as a data point indicating the status of the supply fan). Continuing with the example above, historical data handler 520 can generate a training dataset for pattern recognition engine 524 including the time series including values of the discharge air temperature and a time series including values of the supply fan status. Each time series can have data points associated with the timestamps associated with similar times. For instance, the discharge air temperature time series may include a data point indicating the discharge air temperature to be 62.4 degrees at 08:00:00 and the supply fan status time series can include a data point indicating the supply fan to be 'On' at 08:00:00. Each time series can include any number of data points. Timestamps of the data points may not match each other in some instances (e.g., timestamps may differ by a few seconds within a threshold). Historical data handler 520 can also identify related time series based on matching device identifiers between the time series. In some embodiments, the training datasets generated for pattern recognition engine 524 can be associated with or be the same as the training datasets generated for model-based engine 522.

Advantageously, because historical data handler 520 can generate a training dataset for pattern recognition engine 524 with multiple related time series, pattern recognition engine 524 can more accurately determine probabilities for semantic data tags to apply to the data. Historical data handler 520 may train pattern recognition engine 524 to receive an input including multiple sets of values including any amount of associated data (e.g., some values may be associated with an identifier and some values may be associated with a timestamp). The multiple sets of values may be related based on a common identifier or a common timestamp. For example, if values of two sets of values are associated with a device identifier of 07u324563, the values of the two sets may be related. Pattern recognition engine 524 may be trained to evaluate each value of one set of values in the context of the values of the other related set of values to generate a semantic data tag for the value. For a value of the related value sets, pattern recognition engine 524 may use the values of each set of values and other associated data (e.g., device identifiers and/or timestamps), if any, of each value as inputs to generate the semantic data tag. Pattern recognition engine 524 may do so using tuned model parameters or weights developed during training.

For example, a single set of values from a supply fan may include numeric values indicating the discharge air temperature of the air handling unit over time and a device identifier. The values may range from 54 to 66 degrees. While a machine learning model (e.g., model-based engine 522) may be able to determine a high probability that each value is associated with the discharge air temperature of an air handling unit based on the other values of the set of values, the machine learning model may also determine the values could be a room temperature of a room and have a high probability associated with the room temperature. To account for this possibility, historical data handler 520 can use the first set of values and a second set of values as an input to another machine learning model (e.g., pattern recognition engine 524). The second set of values can include values indicating whether the supply fan is on or off and can eliminate the possibility that the values ranging from 54 to 66 are related to room temperature because a room temperature may not be associated with 'on' or 'off' values. Similarly, while values of 'on' and 'off' may be generic when taken alone and/or in combination with timestamps, by combining the time series of 'on' and 'off' values with the time series including values ranging from 54 to 66, the machine learning model can more accurately determine a probability for a semantic data tag to tag the time series, as values therein, including 'on' and 'off' data as supply fan status data.

In another example, a first time series associated with the discharge air temperature setpoint may include values indicating that the discharge air temperature setpoint was reset. The machine learning models may not be able to accurately generate semantic data tags for the air temperature setpoint time series by itself as the values may be similar to a discharge air temperature. However, if a second time series including data associated with the discharge air temperature is used as an input to the machine learning models in addition to the first time series, the machine learning models may be able to accurately determine that the first time series is associated with a discharge air temperature setpoint based on the second time series including values that lag the discharge air temperature setpoint. Consequently, based on the two time series, the machine learning models may more accurately determine that each value of the first time series is associated with a discharge air temperature setpoint and each value of the second time series is associated with the discharge air temperature.

Further, historical data handler 520 can be configured to use the training datasets as inputs into model-based engine 522 and/or pattern recognition engine 524. Historical data handler 520 can identify which training datasets to input into each machine learning model of model-based engine 522 and pattern recognition engine 524 based on characteristics of the datasets (e.g., a number of time series of the datasets) or based on a tag associated with the dataset indicating the machine learning model for which the datasets should be used as an input. In some embodiments, historical data handler 520 can train both machine learning models using the same training datasets, regardless of the number of time series or values in the datasets. Historical data handler 520 can apply the datasets to model-based engine 522 and/or pattern recognition engine 524 to train each machine learning model.

For example, model-based engine 522 and/or pattern recognition engine 524 may include a neural network to identify probabilities that data from a building management system that is stored in a database is associated with various semantic data tags. The neural network may include any number of layers. Historical data handler 520 can train the neural network by providing training datasets including data points to the neural networks. Each data point can include a value, and, in some cases, a timestamp or an identifier and can be an input into the neural network. The neural networks can determine weights to apply to each data point, which can be associated with a signal of the neural network. The neural networks can generate a probability distribution showing the probability that different semantic data tags are the correct outputs based on the data points. If the training data has been tagged with the correct semantic data output, the neural networks can compare the outputs to the correct semantic data output to obtain differences. The neural networks can identify the differences as a delta and modify, using back propagation, weights of the signals of the neural networks so future outputs can be closer to the expected outputs. The neural networks can modify weights of signals using a learning rate that identifies a degree of change of each weight for each iteration of training data that is applied to the neural networks. As historical data handler 520 applies training data to the neural networks, weights of different signals can change and delta could become smaller. As a result of this training, the neural network can produce more accurate probabilities when generating probabilities of semantic data based on raw input data.

In some embodiments, the neural network can initially have pseudo-randomized weights associated with each of its signals or combination of signals. Historical data handler 520 can apply training datasets to the neural networks until the neural network can determine outputs to a degree of accuracy as specified by an administrator. It should be noted that the neural network described above is an example of a machine learning model that can implemented by model-based engine 522 and/or pattern recognition engine 524. Any machine learning model type can be used by model-based engine 522 and/or pattern recognition engine 524 including, but not limited to, a neural network, random forest, support vector machine, etc. Further, model-based engine 522 and pattern recognition engine 524 may include machine learning models unique to or the same as each other.

Semantic application system 506 is shown to include model-based engine 522. Model-based engine 522 may be or may include a machine learning model (e.g., a neural network, a support vector machine, random forest, etc.) that is dedicated to determining probability distributions for semantic data tags based on data received from a building management system (e.g., building management system 400). The semantic data tags for which model-based engine 522 can determine probabilities can be stored in a database (e.g., historical database 532) within semantic application system 506. As described above, model-based engine 522 can be trained using training datasets generated from data of historical database 532 to individually evaluate values of the data to generate semantic data tags to apply to each value. Individually evaluating the values may include receiving values of data as an input and generating a probability distribution for each value using model parameters or weights on all or a portion of the input values. Once model-based engine 522 has been trained to an accuracy sufficient to meet a predetermined threshold as set by an administrator, live data handler 518 and/or historical data handler 520 can input untagged building time series data to model-based engine 522 to obtain a probability distribution including different semantic data tags for each value of the building time series data. The building time series data may include data from any device or sensor of building management system 400.

Model-based engine 522 can determine probability distributions of semantic data tags for data points in a time series based on data points of the time series. As described above, a time series can include a series of data points for the same point including a timestamp, a value, and a device identifier for each of the values. For example, a time series provided by a temperature sensor can include a series of temperature values measured by the temperature sensor and corresponding timestamps at which the temperature values were measured or received by semantic application system 506. An example of a time series that can be used as an input into model-based engine 522 is as follows:

[<device identifier, timestamp1, value1>, <device identifier, timestamp2, value2>, <device identifier, timestamp3, value3>]

A device identifier may be an identifier of the source of the raw data samples (e.g., time series ID, sensor ID, etc.). Each device identifier, timestamp, and value can be an input into the machine learning model of model-based engine 522. Model-based engine 522 can determine semantic data associated with the raw data samples.

In some instances, model-based engine 522 may determine the probability distribution for values of a series of data that only includes values. In some instances, a time series retrieved from historical database 532 or from building management system 400 may not include a device identifier or, in some instances, a timestamp. An example of a dataset without a device identifier or timestamp is as follows:

[<value1>, <value2>, <value3>]

In such instances, model-based engine 522 can evaluate each value using the other values of the dataset to determine a probability distribution output of semantic data indicating a device identifier, a source, or a type of data for each value of the time series.

In another example, model-based engine 522 may receive a time series including the following data points:

[<00:00, 72>, <01:00, 74>, <02:00, 73>, <03:00, 74>, <04:00, 72>, <05:00, 71>]

The time series may not include any labels indicating what the values are or what the values are associated with. Model-based engine 522 may receive the data points of the time series and use the data points as inputs into the machine learning model of model-based engine 522 to obtain a probability distribution of different semantic data tags the data could be associated with. For instance, the machine learning model of model-based engine 522 may determine that there is a 60 percent chance that each value of the time series is related to a semantic data tag associated with the temperature of a conference room within the building and a 30 percent chance the values of the time series are each related to a semantic data tag associated with the zone air temperature of an air handling unit. The machine learning model may determine that there is a 10 percent chance that the values are each associated with other semantic data tags. The model-based engine 522 can transmit the probability distribution to semantic data applicator 528 to determine which semantic data tag to apply to each value. In other cases, model-based engine 522 may receive a set of values that is not associated with any timestamps. In such instances, model-based engine 522 may perform similar processes using the other values of the set of values as inputs to generate a semantic data tag for each value.

Semantic application system 506 is shown to include pattern recognition engine 524. Pattern recognition engine 524 may be or may include a machine learning model (e.g., a neural network, a support vector machine, random forest, etc.) dedicated to determining probability distributions for semantic data tags for various data points or values of related datasets. The semantic data tags for which pattern recognition engine 524 can determine probabilities of semantic data tags may be stored in a database (e.g., historical database 532) of building management system 400. As described above, pattern recognition engine 524 can be trained using training datasets generated from historical database 532. Once pattern recognition engine 524 has been trained to an accuracy sufficient to exceed a predetermined threshold as set by an administrator, live data handler 518 and/or historical data handler 520 can input live, untagged, time series data to pattern recognition engine 524 to obtain a probability distribution including different semantic data tags for related values. The time series data may include data from any device or sensor of building management system 400.

Pattern recognition engine 524 can determine probability distributions of semantic data tags for values of multiple related time series or dataset based on the values of each related time series or dataset. Pattern recognition engine 524 may evaluate each value of the related time series or dataset in context of each value of the other related time series or dataset using model parameters or weights to generate a probability distribution for semantic data tags to apply to each value. To do so, pattern recognition engine 524 may receive the all or a portion of the values of each related time series or dataset as inputs and use model parameters or weights to generate probability distributions of semantic data tags to apply to each value. For example, pattern recognition engine 524 can identify patterns and/or relationships between the related time series to determine probabilities for potential semantic data tags to associate with each value of each related time series. Time series can be related if the time series is associated with the same point, space, or device. For example, a supply fan may be associated with a time series identifying whether the supply fan is turned on and another time series that 'reacts' (e.g., depends on) to the status of the supply fan and has values that change relative to whether the supply fan is turned on or off. In this example, the time series may be related because they are both associated with a discharge air temperature of an air handling unit supply fan.

Continuing with the example above, the pattern recognition engine 524 may receive a time series associated with the supply fan status as shown below:

[<00:00, Off>, <01:00, Off>, <02:00, On>, <03:00, On>, <04:00, On>, <05:00, On>]

The pattern recognition engine 524 may also receive a time series associated with the discharge air temperature of the same air handling unit supply fan as shown below:

[<00:00, 66.70>, <00:05, 67.00>, <00:10, 69.20>, <00:15, 65.5>, <00:20, 59.5>]

The pattern recognition engine 524 can receive both time series and identify them as being related based on the timestamps of the data points, tags indicating they are associated with each other, a time of receiving each time series (e.g., if the pattern recognition engine 524 received each time series at a similar time, it is more likely the time series are related), etc. The pattern recognition engine 524 can use the values and timestamps of each related time series as inputs into the machine learning model of pattern recognition engine 524 to obtain a probability distribution indicating potential semantic data tags to apply to each value. Based on the values of each time series and the relationship between the values, the machine learning model can output a probability distribution indicating that there is a 70 percent chance that the values of the time series are associated with the supply fan status and that a corresponding semantic data tag should be applied to this time series. The machine learning model can similarly determine that there is a 90 percent chance that values of the discharge air temperature time series are associated with the discharge air temperature and a corresponding semantic data tag should be applied to values of this time series.

Advantageously, by using multiple related time series as inputs to pattern recognition engine 524, pattern recognition engine 524 can determine probabilities for semantic data tags with more precision and accuracy. Time series such as the supply fan status time series described above may only include values such as "on" or "off." In some embodiments, instead of using values of on or off to indicate a supply fan status, the time series may include a "1" for on and "0" for off or vice-versa. Taken alone or with timestamps associated with each value, it may be difficult for a machine learning model to identify appropriate semantic data tags to apply to the time series. However, when pattern recognition engine 524 receives a time series such as the supply fan status time series in addition to another related time series, such as the temperature affected by the supply fan based on the status of the supply fan, the machine learning model can more accurately determine probabilities for semantic data tags for each time series.

Semantic application system 506 is shown to include rule-based engine 526. Rule-based engine 526 can be configured to apply rules to a time series to determine a probability distribution for potential semantic data tags for the time series. The rules can include a set of rules stored in a database within semantic application system 506. Examples of rules of the set of rules includes, but are not limited to, a range of values that is indicative of a zone air temperature measurement, a range of values that is indicative of a supply fan status, a range of values that is indicative of a discharge air temperature measurement, and a range of values that is indicative of chilled water supply temperature.

Rules can be associated with a criteria that can be satisfied. Each rule can be associated with a different criteria and with a probability of a semantic data tag. The rule criteria can include if-then statements, thresholds, ranges, etc. A rule can be satisfied if criteria of the rule is satisfied. The rules can be determined by administrators and input into semantic application system 506 through user device 538. Rule-based engine 526 can include or implement any number of rules. Rule-based engine 526 can receive time series from live data handler 518 and/or historical data handler 520. Rule-based engine 526 can compare data points of a time series to the criteria of each rule of the rules to determine which criteria and rule is satisfied. Rule-based engine 526 can identify the satisfied rule and the probability of the semantic data tag associated with the satisfied rule. Rule-based engine 526 can provide an output to semantic data applicator 528 indicating the probability and the semantic data tag associated with the satisfied rule.

For example, a rule may state that if a time series includes values of data points that vary between 68 and 74 between times of 8:00 and 17:00, the time series has an 80% chance of being associated with a zone air temperature. Rule-based engine 526 may receive a time series from live data handler 518. Rule-based engine 526 can compare the data points to the criteria of the rule to determine if the data points of the time series satisfy the criteria. Rule-based engine 526 may identify the probability (e.g., 80%) and the semantic data tag (e.g., zone temperature) associated with the rule and provide the probability and the semantic data tag to semantic data applicator 528.

Semantic application system 506 is shown to include semantic data applicator 528, in some embodiments. Semantic data applicator 528 can be configured to receive the outputs of model-based engine 522, pattern recognition engine 524, and rule-based engine 526. The outputs can include probabilities and/or probability distributions of potential semantic data tags to apply to one or more time series that live data handler 518 and/or historical data handler 520 provided as inputs to each of model-based engine 522, pattern recognition engine 524, and rule-based engine 526. Semantic data applicator 528 can identify the probabilities and/or probability distributions of the potential semantic data tags and determine whether to apply semantic data tags to the one or more time series. In some embodiments, semantic data applicator 528 can compare the probabilities of the probabilities or probability distributions to a predetermined threshold to determine whether to apply the semantic data tags. The predetermined threshold may be determined by an administrator. If the probabilities exceed the predetermined threshold, semantic data applicator 528 can apply a semantic data tag to the one or more time series. Semantic data applicator 528 may determine whether to apply semantic data tags to time series based on any characteristic of the outputs. Semantic data applicator 528 can tag time series and/or data points of the time series with semantic data tags based on the outputs exceeding the threshold and store the tagged time series in historical database 532. If the outputs do not exceed the threshold, semantic data applicator 528 can store the time series in historical database 532 without tagging the time series.

In some embodiments, semantic data applicator 528 can identify a semantic data tag that is associated with a highest probability of the probability distribution outputs of the machine learning models of model-based engine 522 and pattern recognition engine 524. Semantic data applicator 528 can identify the semantic data tag and process the outputs of the other machine learning model and rule-based engine 526 to identify a matching semantic data tag (e.g., a semantic data tag that is associated with the same string or value) and a probability associated with the matching semantic data tag. Consequently, semantic data applicator 528 can take the outputs of each of model-based engine 522, pattern recognition engine 524, and rule-based engine 526 when determining whether to apply a semantic data tag. In some instances, semantic data applicator 528 may only receive probability distribution outputs from model-based engine 522 and rule-based engine 526 because semantic application system 506 receives a time series without any related time series to input into pattern recognition engine 524. To account for this possibility, pattern recognition engine 524 can be trained to generate a probability distribution output based on the time series without a related time series.

In some embodiments, semantic data applicator 528 can be configured to apply semantic data tags to time series if only one or two (depending on the configuration of semantic data applicator 528) of model-based engine 522, pattern recognition engine 524, and rule-based engine 526 output a probability for a potential semantic data tag that is above the predetermined threshold. Semantic data applicator 528 can identify which of model-based engine 522, pattern recognition engine 524, and rule-based engine 526 provided an output with a probability above the predetermined threshold and apply an associated semantic data tag to the time series if one or two of the outputs exceeded the threshold. For example, a predetermined threshold may be 80%. Semantic data applicator 528 may be configured to apply semantic data tags to time series if two of model-based engine 522, pattern recognition engine 524, and rule-based engine 526 exceed the 80% threshold. Semantic data applicator 528 may receive an output from model-based engine 522 indicating that there is an 82% chance that a proper semantic data tag to apply to a time series is the zone temperature. Semantic data applicator 528 may receive an output from pattern recognition engine 524 indicating that there is a 60% chance that the proper semantic data tag to apply to the time series is the temperature of the zone. Semantic data applicator 528 may receive an output from rule-based engine 526 indicating that there is an 86% chance that the proper semantic data tag to apply to the time series is the temperature of the zone. Because two of the three outputs have a probability for a semantic data tag that exceeds the 80% threshold, semantic data applicator 528 may apply the temperature of a zone semantic data tag to the input time series that resulted in the outputs.

In some embodiments, semantic data applicator 528 can determine whether to apply semantic data tags to a time series by aggregating or taking the average of the probabilities of the outputs that model-based engine 522, pattern recognition engine 524, and rule-based engine 526 produced from a time series input. Semantic data applicator 528 can compare the aggregated or averaged data to a predetermined threshold to determine whether to apply the semantic data tag to the time series input if the aggregated or averaged data exceed the predetermined threshold. For example, semantic data applicator 528 can receive outputs from model-based engine 522, pattern recognition engine 524, and rule-based engine 526 with probabilities of 70%, 80%, and 92%, respectively. A predetermined threshold can be set to 270%. Semantic data applicator 528 can aggregate the outputs to obtain an aggregated value and determine that the aggregated value does not exceed the predetermined threshold. Semantic data applicator 528 may determine not to tag the semantic data based on the aggregated value not exceeding the threshold.

In some embodiments, semantic data applicator 528 can determine whether to apply semantic data tags to values of a data set or of a time series by determining if the values of the time series satisfy a criteria of a rule. Semantic application system 506 can store a second set of rules that are used to determine which semantic data tags to apply to values of the time series. The rules can include criteria that can be satisfied by the outputs of model-based engine 522, pattern recognition engine 524, and rule-based engine 526. Semantic data applicator 528 can compare the outputs with criteria of the rules and determine whether any of the rules are satisfied. If semantic data applicator 528 determines a rule is satisfied, semantic data applicator 528 can apply a semantic data tag associated with the satisfied rule to the time series or values of the time series.

For example, semantic data applicator 528 may receive outputs from model-based engine 522, pattern recognition engine 524, and rule-based engine 526 indicating a 95% probability, an 85% probability, and a 75% percent probability, respectively, that values of a time series are associated with the zone air temperature of a conference room. Semantic application system 506 may store a rule indicating that if any of the outputs of model-based engine 522, pattern recognition engine 524, and rule-based engine 526 have a probability that exceeds 90%, semantic data applicator 528 can apply a semantic data tag associated with the probability to the input time series that resulted in the output. Semantic data applicator 528 can identify the rule and determine that the criteria of the rule is satisfied based on the output from model-based engine 522. Semantic data applicator 528 can apply the semantic data tag to the values or the time series that was used as an input to the machine learning models of model-based engine 522 and pattern recognition engine 524 and rule-based engine 526.

Once semantic data applicator 528 determines which, if any, semantic data tags to apply to a time series or data point (e.g., unrecognized data), semantic data applicator 528 can respectively tag the time series or data point and transmit the tagged time series or data point to building management system 400. In some cases, if semantic application system 506 is a part of building management system 400, semantic data applicator 528 may transmit the tagged time series or data point to historical database 532 to be stored. In some instances, semantic data applicator 528 can generate a report including the tagged time series or data point to be displayed at a graphical user interface of user device 538. In some embodiments, semantic data applicator 528 may present a user interface to a user of building management system 400 (e.g., a user at user device 538) that allows the user to confirm the semantic information before applying the semantic information to the time series or data point. In some embodiments, semantic data applicator 528 can include probability distributions and rule outputs that were generated by model-based engine 522, pattern recognition engine 524, and rule-based engine 526 in the report. Semantic data applicator 528 can transmit the time series and/or data point in any form.

In some embodiments, semantic data applicator 528 may determine relationships between devices based on the semantic data tags and data time series that were used to generate the semantic data tags. For example, semantic application system 506 may receive two time series: a time series associated with a supply fan status and a time series associated with a VAV box supply air flow. While neither time series may have been tagged when they were sent to semantic application system 506, the machine learning models of semantic application system 506 may operate to determine that one time series is associated with a supply fan status and the other time series is associated with a VAV box supply air flow. In addition to determining a semantic data tag for each time series, components of semantic application system 506 may determine that the two time series are related based on the values of each time series.

For example, the machine learning models of semantic application system 506 may be trained to determine relationships between devices based on the same time series that the machine learning models use to generate the semantic data tags. The machine learning models may examine the values of the time series and, based on the training that the machine learning models have received from training data and/or live data, determine a probability distribution of devices (or entities in a Brick schema as described below) that may be associated with each other. Continuing with the example above, the machine learning models may identify that the values of the time series associated with the VAV box supply air flow increase when the values of the supply fan status of an AHU is set to on and/or values of the VAV box supply air flow decrease when the supply fan status of the AHU is set to off. Based on these values, the machine learning model may determine that there is a high probability that the AHU and VAV box are associated with each other (e.g., the AHU provides air to the VAV box). In some embodiments, semantic data applicator 528 determines the relationships using a rule based system similar to the rule based system of rule-based engine 526 on the data of the time series.

Referring now to FIG. 6, a table 600 showing an example of data associated with historical database 532 including tagged and untagged data points is shown, according to some embodiments. Table 600 is shown to include an ID column, a values column, and a semantic data tag column. Table 600 is also shown to include rows. Each row may represent a data point of table 600 and include values (e.g., strings) within each column. The data points can be associated with values generated and/or measured by sensors of building subsystems 428. Each data point can be associated with a device identifier and value. The device identifier may indicate a device associated with the data point. The value may indicate the value that a sensor measured and/or generated. In some instances, although not shown, each data point may be associated with a timestamp indicating a time that the sensor measured and/or generated the value or a time that historical database 532 received the data point. As shown in FIG. 6, an example of a device identifier includes "GUID: 07u615248." Table 600 is shown to include data points with semantic data tags and data points without semantic data tags. Once the machine learning models of semantic application system 506 have been trained, historical data handler 520 can input the untagged data points to machine learning models 522 and 526 and rule-based engine 526 to determine semantic data tags to apply to the untagged data points.

Referring now to FIG. 7, a table 700 associated with historical database 532 including an example training dataset including a time series tagged with semantic data is shown, according to some embodiments. Table 700 is shown to include data points represented by each row of table 700. Each data point may include any of a timestamp, a value, and semantic data identifying different aspects (e.g., points or characteristics of a building) that the data point is associated with. In some embodiments, the data points do not include timestamps. In some embodiments, the time series shown in table 700 is a training dataset generated by historical data handler 520 that historical data handler 520 can input into the machine learning models of model-based engine 522 for training. Model-based engine 522 can use such training datasets to learn to individually evaluate values of datasets using the other values and information (e.g., time-stamps or identifiers) of the dataset as inputs to generate semantic data tags for each value of the dataset. As shown, each data point in the time series is shown to be tagged with semantic data identifying that the data point is associated with a zone air temperature. In some instances, the time series of table 700 can be received from a building system (e.g., building management system 400). It should be noted that the time series represented in table 700 is exemplary. Time series related to any aspect of a building system can be used to train model-based engine 522.

The time series of table 700 is shown to include data points including values for a timestamp of the data point, values of the data point, and semantic data of the data point. The timestamps of the data points of the time series are shown to include times between 23:10:00 of 2015-12-31 and 00:20:00 of 2016-01-01. The timestamps can be associated with a time that the data point was generated or a time that historical database 532 received the data point. The values of the data points are shown to include values between 71.1 and 71.4 and be associated with a building device with an ID of GUID: 09u243098. The values and the building device ID can be received from building management system 400, which provided the data points. The values of the semantic data column can be semantic data tags associated with the data points that describe what aspect or characteristic of a building that the values of the data point are associated with. The semantic data tags can be associated with the data points by the building management system (e.g., building management system 400) that provided the data points, by an administrator input, or by semantic application system 506 as a result of implementing the machine learning models and rule-based engine 526. The semantic data tags of the time series of table 700 are shown to include strings, each string having a value of "Zone Air Temperature." Data points can be associated with any semantic data tag.

Referring now to FIG. 8, an example training dataset including two related time series (e.g., Time series 1A and Time series 1B) is shown, according to some embodiments. The time series may be represented as tables 802 and 804. Values of the time series may be related because they are associated with the same building device or building characteristic. Semantic application system 506 may determine that each value of the time series is associated with the same building device based on device identifiers associated with the values. The values of each time series may, in some instances, be associated with a timestamp or an identifier. In some embodiments, the time series of tables 802 and 804 may be related because values of timestamps associated with the data points of the time series may be the same. Semantic application system 506 may evaluate each value of the data points of one time series in context with the values of the data points in the other time series to generate a probability distribution for semantic data tags to apply to each value. For example, semantic application system 506 may use the values of related time series as inputs to generate a probability distribution for semantic data tags to apply to each value. Semantic application system 506 may use model parameters or weights on the inputs to generate each probability distribution. The time series of tables 802 and 804 are each shown to include data points represented by rows of tables 802 and 804. The data points are shown to include values for the timestamp, values, and semantic data columns of tables 802 and 804. The time series may include more or less data (e.g., some data points may not include a timestamp or a device identifier). Data points of the time series of table 802 can match data points of the time series of table 804 because values of the data points of both time series may be associated with similar timestamps and or device identifiers.

The time series of tables 802 and 804 can be included in a training dataset for the machine learning model of pattern recognition engine 524. Historical data handler 520 can input both time series into the machine learning model to obtain an output for a most likely semantic data tag to associate with the data points and/or time series. The machine learning model can determine probabilities for different semantic data tags and compare the probabilities to the actual semantic data tags (e.g., supply fan status and discharge air temperature). The machine learning model can adjust (e.g., change by a learning rate, delta) for any differences between the predicted probabilities and the actual semantic data tags of the time series training data.

Figure 9:
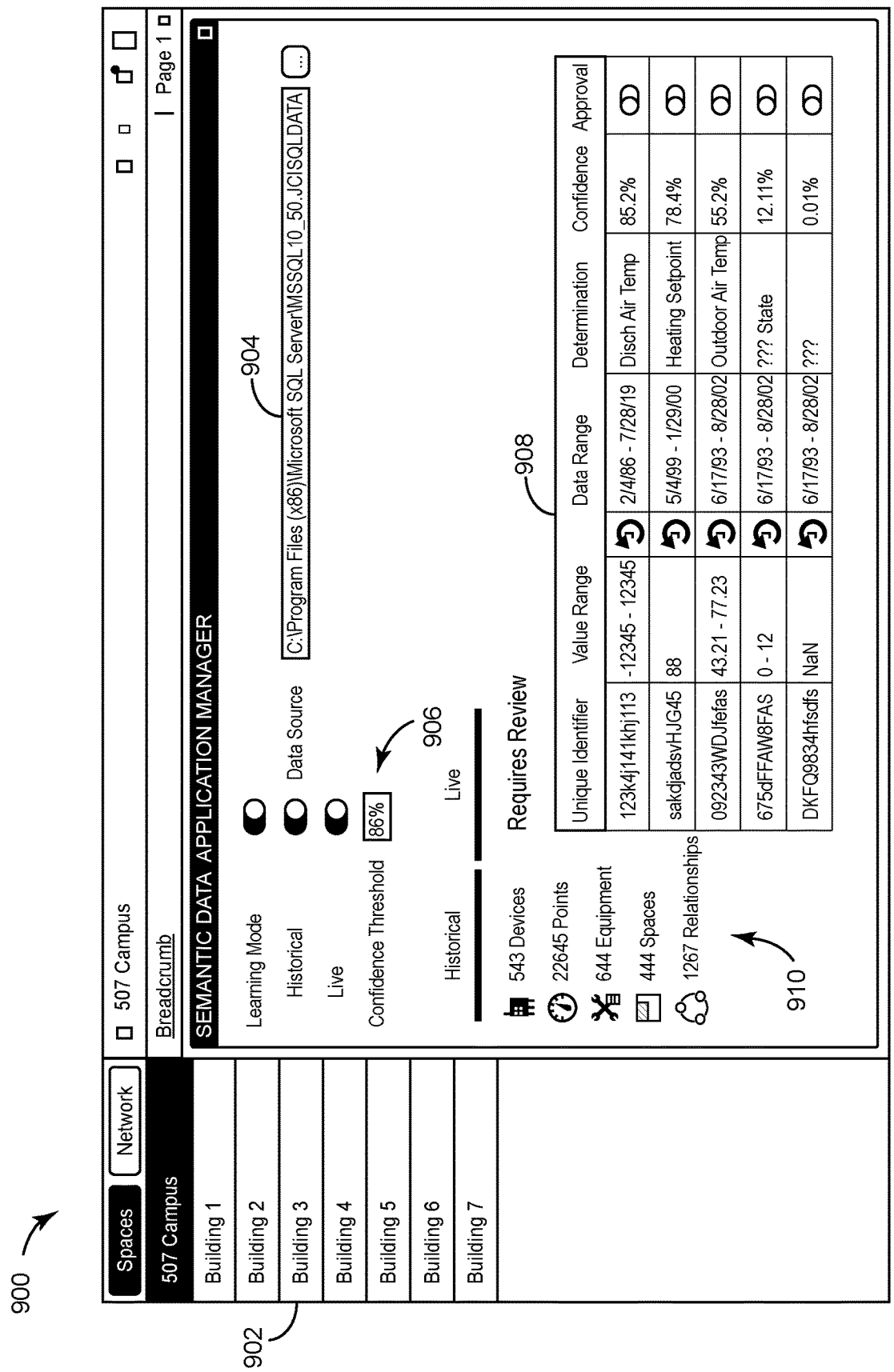
FIG. 9 is a drawing of an example user interface associated with the semantic application system of FIG. 5, according to some embodiments.

For example, FIG. 9 is a drawing of an example user interface 900 associated with semantic application system 506, according to some embodiments. User interface 900 is shown to include a spaces tree 902, a data source 904, settings 906, a list of pending semantic data tags 908, and a list of applied semantic data tags 910. Through a client device, a user (e.g., an operator) may interact with user interface 900 to configure building management system 400 or any other building management system that implements the systems and methods described herein. The user may select various spaces (e.g., sites, buildings, rooms, parts of a room, etc.) of spaces tree 902 and identify data that semantic application system 506 has received that is associated with the selected space. Through user interface 900, the user may efficiently apply semantic data tags and generally configure building management system 400 with assistance from the machine learning capabilities provided by semantic application system 506. For example, the user may assess training progress of various learning models, set a confidence threshold for semantic application system 506 to apply when generating semantic data tags, and review and approve semantic data tag suggestions associated with a confidence score below the confidence threshold.

List of applied semantic data tags 910 may include a list of semantic data tag counters for various aspects of building management system 400. As shown, list of applied semantic data tags 910 may include counters for semantic data tags related to devices, points, equipment, spaces, and relationships of building management system 400. User interface 900 may update a counter for the associated aspect each time semantic application system 506 generates a semantic data tag for a value associated with the aspect. For example, semantic application system 506 may determine that there is an 80% probability that a particular value should have a temperature sensor semantic data tag. Semantic application system 506 may compare the 80% probability to a preset 70% threshold and determine that the probability exceeds the threshold. Consequently, semantic application system 506 may apply the temperature sensor semantic data tag to the value and increment the point counter of list of applied semantic data tags 910. In some implementations, applied semantic data tags 910 may also increment the counter when a user accepts a predicted semantic tag from list of pending semantic data tags 908.

The user may assist in the training of the learning models of semantic application system 506 by selecting options from settings 906. The user may view various live and historical data time series to input into the learning model to be tagged with a semantic data tag. The live and historical data may be retrieved from data source 904. Data source 904 may be a historical database (e.g., historical database 532), a cloud database (e.g., cloud database 534), a training database (e.g., training database 536), building equipment of building management system 400, an external data source provider such as a server associated with a domain, etc. Both the live and the historical data may include tagged, partially tagged, and untagged data time series. The user can toggle a learning mode to on to use the machine learning model to generate and apply semantic data tags to unrecognized historical data, live data, or a combination of historical data and live data. Further, via user interface 900, the user can view and change the confidence score threshold that semantic application system 506 may use to identify whether it has enough confidence to apply a semantic data tag to a data time series.

Any semantic data tag that is associated with a confidence score that does not exceed the confidence score threshold may be displayed in list of pending semantic data tags 908. List of pending semantic data tags 908 may include a list of time series data, each time series of the time series data may include an identifier (e.g., a device identifier, a time series identifier, a MAC address, an IP address, etc.) associated with the time series, a value range, a date range, a suggested semantic data tag, a confidence score, and an approval option. The user may view list of pending semantic data tags 908 and approve or disapprove of any semantic data tag suggestions. List of pending semantic data tags 908 may display any semantic data tags.

In some embodiments, user interface 900 may display an accuracy percentage indicating how accurate the learning models of semantic application system 506 are in predicting semantic data tags. The user may use the accuracy percentage to determine if the learning models are trained enough (e.g., to an accuracy percentage exceeding a threshold) to be implemented in building management system 400.

Figure 10:
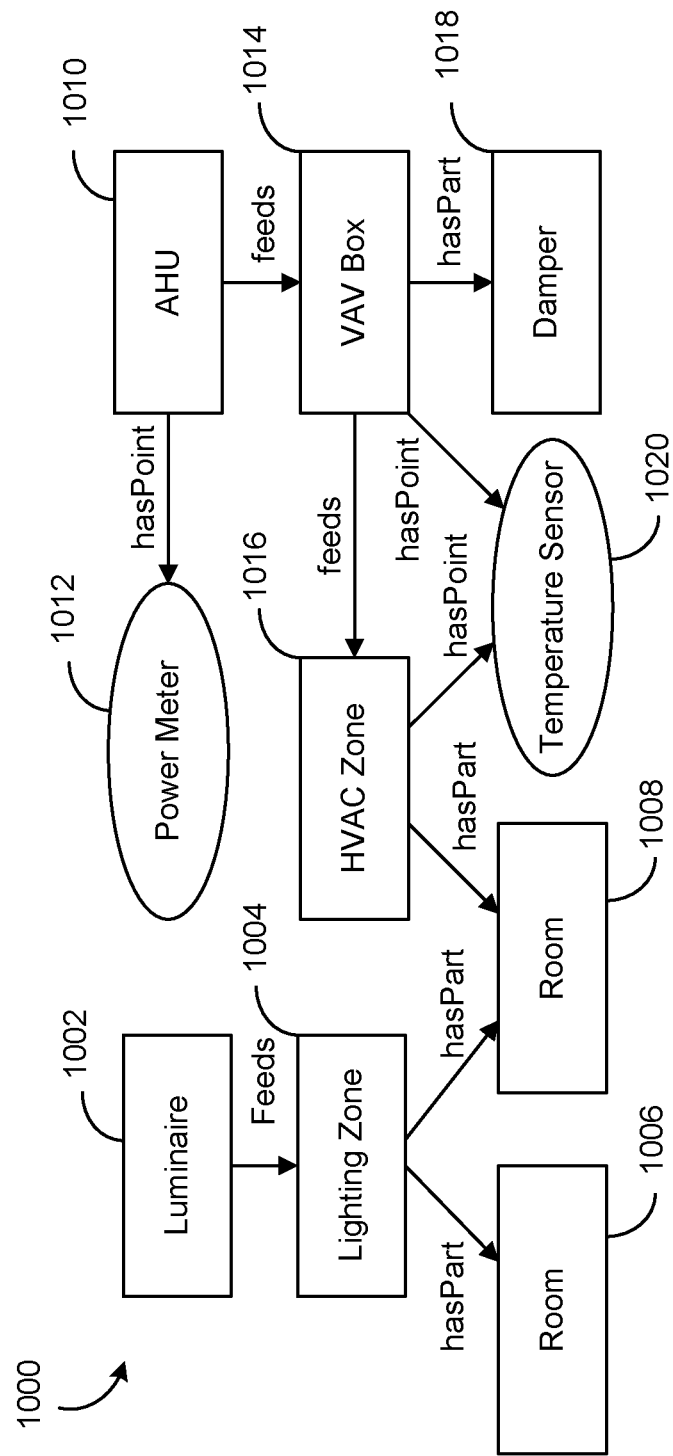
FIG. 10 is a block diagram of a building model of the BMS of FIG. 4 including multiple entities and relationships between the entities, according to some embodiments.

Referring now to FIG. 10, a block diagram of an example directed graph 1000 associated with building 10 including multiple entities and relationships between the entities is shown, according to some embodiments. Directed graph 1000 may be associated with different open source standards such as, but not limited to, Brick Schema, Project Haystack, etc. Brick Schema, for example, may represent building entities using directed graphs similar to directed graph 1000. Directed graph 1000 is shown to include a luminaire 1002, a lighting zone 1004, a room 1006, a room 1008, an AHU 1010, a power meter 1012, a VAV box 1014, an HVAC zone 1016, a damper 1018, and a temperature sensor 1020. Each of components 1002-1020 may be an entity as defined by Brick Schema. Further, each of the entities may have a relationship with another entity indicating how the entities are related (e.g., how the entities affect or are associated with each other). The relationships may be relationship entities. Each relationship entity may include a semantic descriptor indicating a type of relationship that the entities have with each other. Types of relationships can include relationships specifically associated with Brick Schema or custom relationships as defined by users. For example, as shown in FIG. 10, types of relationships can include, but are not limited to, feeds, hasPart, and hasPoint. Other examples of types of relationships can include locatedIn, hasFloor, isPartof, hasSensor, is-a, etc. Entities and relationships of Brick Schema are described with further reference to U.S. patent application Ser. No. 16/142,803 filed Sep. 26, 2018, and U.S. patent application Ser. No. 16/143,243 filed Sep. 26, 2018, the entirety of each of which are incorporated by reference herein.

Once semantic application system 506 has generated semantic data tags for the untagged data, semantic application system 506 may identify the semantic data tags as relationships between entities of the directed graph. For example, for a data time series associated with a point, semantic application system 506 may determine and generate a semantic data tag indicating a temperature sensor point that is associated with HVAC zone 1016. Semantic application system 506 may attempt to identify a corresponding temperature sensor point from a directed graph of the building management system. If there is not a corresponding temperature sensor point, semantic application system 506 can update the directed graph to include a temperature sensor entity and a hasPoint relationship entity between the temperature sensor and HVAC zone 1016. In another example, semantic application system 506 may generate a power meter semantic data tag from data that is associated with AHU 1010. Based on the power meter semantic data tag, semantic application system 506 may update the directed graph to include a power meter entity and a hasPoint relationship entity between power meter 1012 and AHU 1010. In another example, semantic application system 506 may generate a relationship tag identifying an entity type of an entity. For instance, semantic application system 506 may identify a VAV box in a building based on a semantic data tag with an is-a relationship indicating that an entity of a directed graph is a VAV box.

In another example, entities within building management system 400 may be represented in accordance with Project Haystack. Project Haystack provides a standardized semantic data model that stores and organizes data related to building management systems. Project Haystack may implement semantic data tags to describe various entities of building management systems. Entities may be representations of building equipment or spaces of a building management system. For example, an AHU within building management system 400 may be labeled with semantic data tags such as hvac, rooftop, mau (makeup air unit), chilled WaterPlantRef, hotWaterPlantRef, steamPlantRef, etc. Entities may include any number of semantic data tags.

In some cases, entities may not be labeled with all of the points with which they are associated within Project Haystack. A user can use semantic application system 506 to generate semantic data tags for each unlabeled point and update entities with the non-labeled points to include the semantic data tags. For example, semantic application system 506 may process a data time series. Using the machine learning models described herein, semantic application system 506 may generate a semantic data tag for the time series indicating that the time series and values of the time series are associated with a return air pressure sensor of an AHU. There may not be a tag for the AHU associated with the return air pressure sensor. Consequently, semantic application system 506 may add a tag associated with the return air pressure sensor to the entity of the AHU, and, in some cases, associate values of the time series with the tag.

Figure 11:
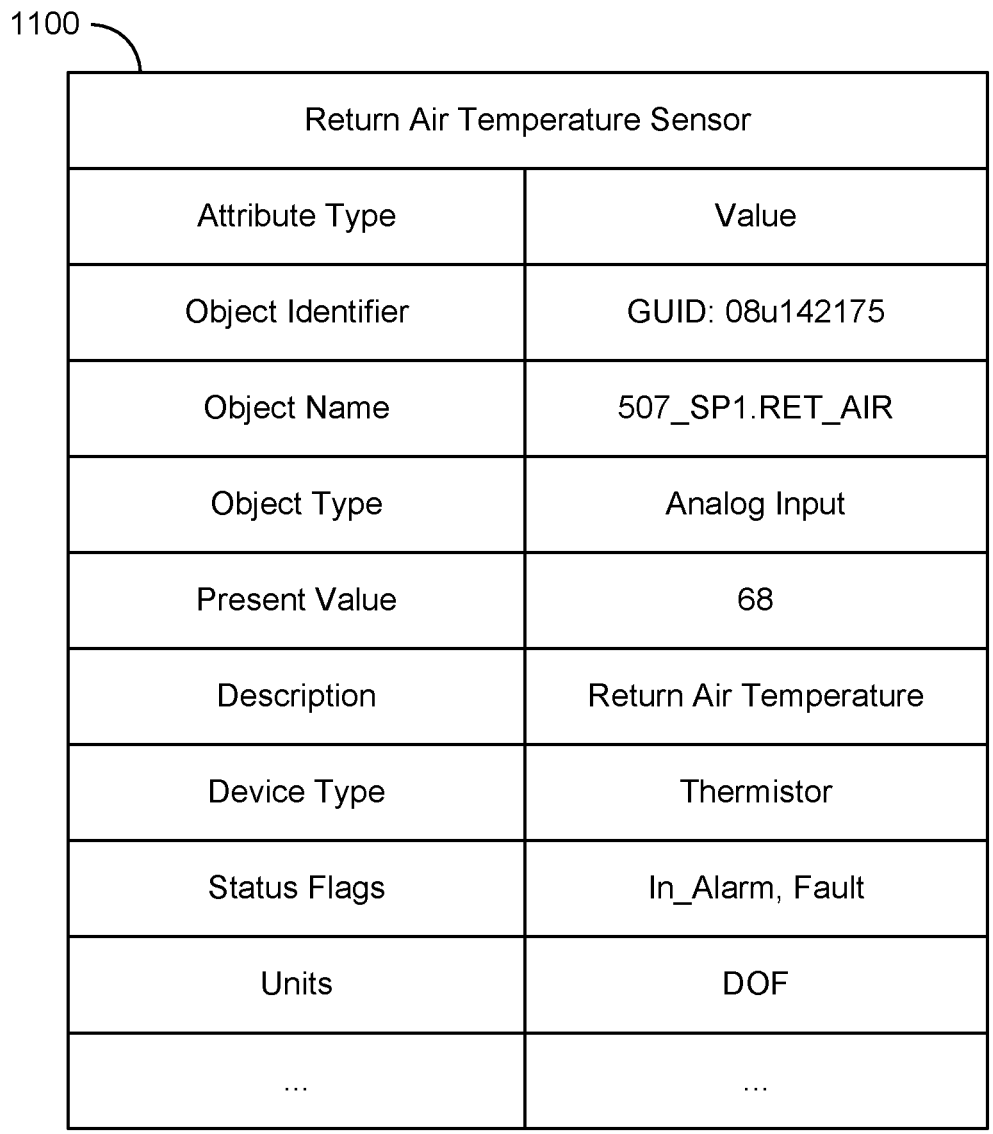
FIG. 11 is a table showing an example BACnet object associated with the semantic application system of FIG. 5, according to some embodiments.

Referring now to FIG. 11, a table showing an example BACnet object 1100 associated with semantic application system 506 of FIG. 5 is shown, according to some embodiments. BACnet object 1100 may be associated with equipment in building management system 400. BACnet objects of building management system 400 may represent points, binary inputs, binary outputs, binary values, analog inputs, analog outputs, or any other aspect of building management system 400. BACnet object 1100 is shown to include a set of attributes. The set of attributes is shown to include an object identifier, an object name, an object type, a present value, a description, a device type, status flags, units, etc. BACnet objects can have any number of attributes.

In some cases, equipment may not be associated with a BACnet object. A user can implement semantic application system 506 to generate BACnet objects for the equipment. For example, semantic application system 506 may process a data time series or value data set including a device identifier and values ranging from 65 to 73. Using the machine learning models described herein, semantic application system 506 may generate a semantic data tag for the values of the time series or the time series itself indicating that the each value is associated with a return air temperature sensor. The return air temperature sensor may not be associated with a BACnet object. Consequently, semantic application system 506 may generate a BACnet object associated with the device identifier of the return air temperature sensor. Semantic application system 506 may map a value of the time series to a present value attribute of the generated BACnet object, a device identifier to the object identifier attribute of the generated BACnet object, and a description of "return air temperature" to a description attribute of the BACnet object.

As semantic application system 506 receives more data points of various time series or value data sets, semantic application system 506 may update BACnet objects with data points of the time series based on semantic data tags that semantic application system 506 generates. Semantic application system 506 may generate semantic data tags for the data points and identify the BACnet objects and attributes from the semantic data tags. Semantic application system 506 may update the attributes of the BACnet objects with the data points by writing the data points to the identified attributes as values.

Similarly, a user can implement semantic application system 506 to update equipment models of building management system 400. The equipment models can be representations of equipment of building management system 400. The equipment models can be three-dimensional or two-dimensional renderings of building equipment displayed at a user interface of building management system 400. Each equipment model may be associated with a number of points. For example, an AHU may be associated with points such as a discharge air temperature sensor, discharge air humidity sensor, return air temp sensor, return air humidity sensor, etc. Each point may be associated with an equipment model of the AHU.

In some instances, for example, an equipment model of an AHU may not be associated with a specific point within a building management system. The equipment model may not have a point associated with a discharge air temperature sensor. By inputting data of a building management system of the AHU into the machine learning models of semantic application system 506, semantic application system 506 can identify the missing point of the AHU based on a semantic data tag generated by semantic application system 506. Semantic application system 506 can tag the data with the semantic data tags that identify the point and identify the equipment model of the device associated with the data. If the equipment model of the device does not have a point associated with the semantic data tags, semantic application system 506 can update the equipment model to include the point or a description of the point. Further, semantic application system 506 may write the values of the tagged data to the point to keep a history of values that are associated with the point. Equipment models are described with further reference to U.S. Pat. No. 9,703,276 filed Apr. 11, 2014, and U.S. patent application Ser. No. 15/592,031 filed May 10, 2017, the entirety of which are incorporated by reference herein.

Figure 12:
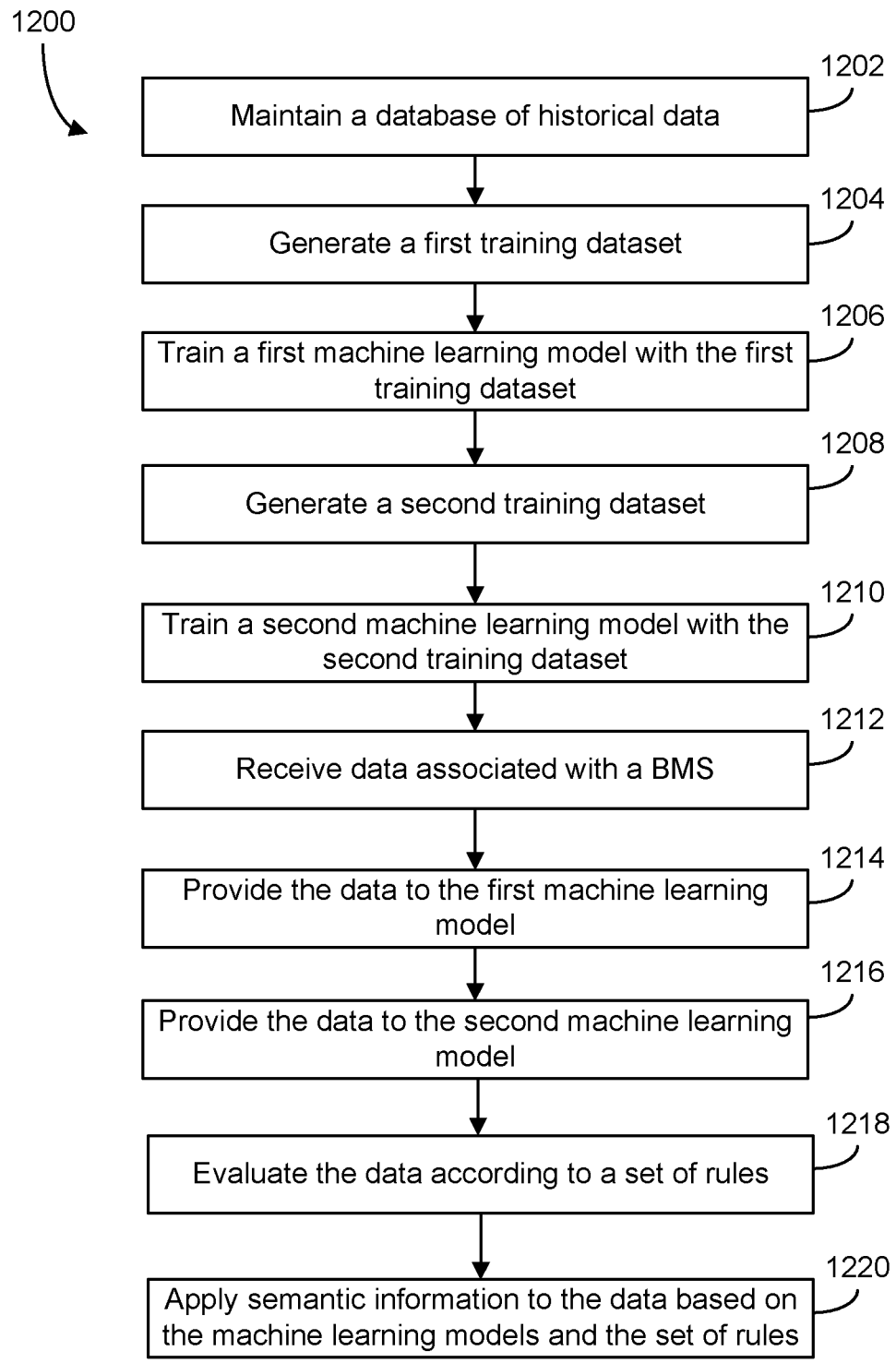
FIG. 12 is a flow diagram of an example process for applying semantic information to building data that can be performed by the semantic application system of FIG. 5, according to some embodiments.

Referring now to FIG. 12, a flow diagram of a process 1200 for determining and applying semantic data tags to building data is shown, according to some embodiments. Process 1200 can be performed by a data processing system (e.g., semantic application system 506). Process 1200 may allow users of building management system 400 to easily configure building management system 400 using dynamically-generated semantic data tags that are applied to building data. For example, various entities associated with building 10 may be represented using an open-source standard such as Brick Schema and/or Project Haystack as described above, and process 1200 can be used to dynamically apply metadata in accordance with such open-source protocols. In some embodiments, process 1200 involves user interaction such as through example user interface 900 as described above. Process 1200 may allow users such as operators and other personnel to efficiently apply semantic information to building data by removing the need for more manual efforts required in some previous approaches.

Process 1200 is shown to include maintaining one or more databases of historical data (step 1202). For example, the one or more databases may include historical database 532, cloud database 534, and/or training database 536 as described above. One database may locally collect and store building data (e.g., values of points generated by building sensors, building device configuration data, etc.) that is specific to building management system 400. The database may store the building data as time series data including values with timestamps labeling times that the values were generated or times that the database received the values. For example, the database may store a time series with values associated with the outside air temperature of building management system 400 between 7:00 PM and 10:00 PM with values at five minute intervals. The outside air temperature values may each be associated with a device identifier identifying the sensor that generated the value. All, none, or a portion of the values of the time series may be associated with a semantic data tag indicating that the values are associated with the outside air temperature. The time series data of the database may be used to train machine learning models of the data processing system to predict or generate semantic data tags for unrecognized data.

Similarly, another database may be a cloud database that stores data specific to building management system 400. The cloud database may offer users a more expansive view of building management system 400 by collecting and storing building data and other types of data (e.g., weather data, utility consumption data, spatial information, facility mappings, etc.) that is associated with building management system 400. The cloud database may include data that is encrypted using various encryption protocols (e.g., Advanced Encryption Standard, Triple Data Encryption Standard, etc.). Advantageously, because the cloud database includes different types of data in addition to the building data that may be stored locally at building management system 400, users can obtain a broader view of how building management system 400 is operating. For example, users can compare weather data with different building data at similar timestamps to determine how the weather impacts operation of the building. Further, the cloud database may operate as a back-up storage for any data stored locally at building management system 400. Because the cloud database may be encrypted, the information in the database may be secure against malicious parties.

In some implementations, the one or more databases may also include a training database. The training database may be a cloud database and be in communication with multiple building management systems, including building management system 400, and receive building data from each building management system. The training database may include semantic data tags that are consistent across each of the multiple building management systems. For example, an air handling unit point value (e.g., a supply fan status) in the training database may have a semantic data tag of AHU-Supply Fan Status. The training database may store values of each building management system associated with an AHU supply fan status as AHU-Supply Fan Status. Values of different points and relationships may be associated with semantic data tags that are the same across building management systems that provide data to the training database. Consequently, users viewing the data of the training database may be able to make informed insights into how the various building management systems operate based on the uniform descriptors across building management systems without manually converting values with different descriptors of the same point or relationship to do an analysis.

Further, values of the training database may be used as training data for the machine learning models described herein so the machine learning models may automatically generate semantic data tags for unrecognized values of building data. Because descriptors of the values in the training database are the same across various building management systems, data obtained from any building management system may be used to train another building management system that also provides data to the training database. Consequently, the machine learning models of various building management systems may learn to generate similar semantic data tags. Advantageously, by being able to use data from other building management systems for training, the machine learning models may continue to be trained by training data generated by other building management systems in addition to the building management system for which the machine learning models are tagging data. The machine learning models may be trained more quickly over time using data from multiple building management systems.

Process 1200 is shown to include generating a first training dataset (step 1204). For example, step 1204 may be performed by live data handler 518 and/or historical data handler 520 as described above. The data processing system can generate the first training dataset from a time series of the database storing data. The first training dataset can include a single time series with data points tagged with semantic data tags. Each data point may include a value that may be associated with a device identifier or a timestamp. The data processing system can generate the first training dataset by processing the data in the database and identifying time series that include tagged and/or untagged values. The first training dataset may include one or more individual values and corresponding semantic data tags indicating points, relationships, or different aspects of the building management system. Each value may be associated with an identifier. Each value may also be associated with a timestamp associated with the time that the value was generated or a time that the database received the value. For example, the first training dataset may include data such as in example table 700, shown and described above with reference to FIG. 7. The first training dataset may include a series of values for a zone air temperature ranging between 71.1 and 71.4. Each value may be tagged with a zone air temperature tag and a device identifier of the sensor that detected the zone air temperature. The values of the first training dataset may be used as inputs to the first machine learning model for the first machine learning model to generate probability distributions of semantic data tags to apply to each value. The first machine learning model may compare the output probability distributions to the respective actual tag and adjust its model parameters or weights to indicate that the values of time series that range between 71.1 and 71.4 may be zone air temperature values.

Process 1200 is shown to include training a first machine learning model with the first training dataset (step 1206). The first machine learning model may be similar to a learning model of model-based engine 522. The first machine learning model may be a neural network, Random Forest, a support vector machine, etc. The data processing system can use the first training dataset to train the first machine learning model. By applying the training dataset to the first machine learning model, the first machine learning model may be trained to associate a given input with a given output (e.g., associate an individual value with a semantic data tag). The first machine learning model may be trained to evaluate each value of the first training dataset individually using tuned model parameters or weights on the value and the other values of the first training dataset. Using all or a portion of the values and, in some cases, the associated data (e.g., timestamps and/or device identifiers) of the training dataset as an input, the first machine learning model may generate an output predicting a semantic data tag to apply to each individual value of the first training dataset. The first machine learning model may predict the semantic data tags using model parameters or weights that may be random when the first machine learning model is first in an untrained state and that are gradually tuned to accurately predict semantic data tags as more training data is input into the machine learning model. If the first training dataset includes semantic data tags for data points of the first training dataset, the first machine learning model can compare the output to the actual semantic data tags and adjust its model parameters or weights based on differences between the actual semantic data tags and the output to better fit the training data. The data processing system can apply training datasets from the historical data of the database to the machine learning model until the machine learning model is accurate to a threshold determined by an administrator. Advantageously, by training the first machine learning model with data including individual values, the first machine learning model may be able to accurately predict semantic data tags to apply to individual values of live building data and untagged historical data of the database.

Process 1200 is shown to include generating a second training dataset (step 1208). The second training dataset can be generated for a second machine learning model. The second training dataset can include multiple related time series. Each related time series can include data points with matching timestamps (e.g., timestamps associated with the same time). For example, related time series may include a time series of a discharge air temperature and a time series of a setpoint of the discharge air temperature. Because the first machine learning model may evaluate values of time series individually, the first machine learning model may struggle to differentiate between the two types of time series because the values are similar (e.g., generate a high probability for multiple semantic data tags or generate a probability distribution without a high probability). However, if a second machine learning model is trained to evaluate values of a first time series in context of values of a second time series using various model parameters or weights, the second machine learning model may be able to identify that the discharge air temperature time series values lag the discharge air temperature setpoint time series. The second machine learning model may use values of both time series (and associated data, if any) as an input to evaluate the values of the first time series in context of values of the second time series. Consequently, continuing with the example above, the second machine learning model can be trained using training datasets such as the second training dataset to identify each value of one time series as being associated with a discharge air temperature and each value of another time series as being associated with a discharge air temperature setpoint. The second machine learning model may be trained to identify values of time series or datasets to be associated with any semantic data tag.

The data processing system can identify values of time series as being related based on a device identifier associated with each value. The data processing system can compare the device identifiers of the values of the time series with each other and identify values of time series with matching device identifiers as related time series. The data processing system can identify time series with similar device identifiers to generate the second training dataset.

Process 1200 is shown to include training a second machine learning model with the second training dataset (step 1210). The second machine learning model may be a neural network, Random Forest, a support vector machine, etc. Similar to the training that the data processing system performs in step 1206, the data processing system can use the second training dataset as an input into the second machine learning model. The second machine learning model can receive the second training dataset and be trained to associate values of multiple time series or sets of values with a given output (e.g., associate values of related time series with semantic data tags). The second machine learning model may evaluate the values of the related time series in context with values of the other weighted time series (e.g., use values from both related time series as inputs into the second machine learning model). The second machine learning model can use model parameters or weights on the values of both related time series to generate an output including predictions for semantic data tags to apply to each value of the related time series. If the values of the second training dataset are tagged with actual semantic data tags, the second machine learning model can compare the output predictions with the actual semantic data tags and adjust its model parameters or weights to fit the training data. The data processing system can continue applying training data including related time series to the second machine learning model for training until the second machine learning model is trained to an accuracy threshold set by an administrator. Advantageously, by training the second machine learning model using the related time series, the second machine learning model may be trained to handle and automatically determine semantic data tags for values of multiple related time series. The second machine learning model can be trained to handle data with different types of values. For example, the second machine learning model can use a dataset including on and off values and a second dataset including large numerical values (e.g., values between 70 and 80) as an input to generate semantic data tags for the values of each dataset.

The output of the trained second machine learning model may be useful when the first and second machine learning model receive data time series with values that could accurately correspond with multiple data points or semantic data tags. For example, the second machine learning model may more accurately determine that a set of values that just includes values of on and off is associated with a supply fan status if the second machine learning model also uses data from a related set of values related to a discharge air temperature that decreases when the supply fan status is on to make the determination.

Process 1200 is shown to include receiving data associated with a building management system (step 1212). The data can be one or more time series generated from one or more sensors associated with a device or space of the building management system. The data can be unrecognized live data or historical data of various devices of the building management system. For example, the data may only include a timestamp, an identifier (e.g., a device identifier, a time series identifier, a MAC address, an IP address, etc.), and a value. For example, received data may be of the following form:

[<device identifier, timestamp1, value1>, <device identifier, timestamp2, value2>, <device identifier, timestamp3, value3>]

The data processing system can receive the data and use the techniques described herein to tag the unrecognized data with semantic data tags. Advantageously, by using these techniques, users may no longer need to manually go through unlabeled data for labeling. Instead, the users can input the data into the machine learning models, which can automatically determine which semantic data tags to apply to unrecognized input data.

Process 1200 is shown to include providing the data to the first machine learning model (step 1214). The data processing system can use the data points of a time series of the data as inputs to the first machine learning model. The data points may include one or more live unrecognized values that the data processing system received from the data processing system and/or historical unrecognized values that the data processing system had stored in a database of the data processing system. The first machine learning model may evaluate each value of the time series individually using various model parameters or weights tuned during training to generate an output indicating semantic data tags to apply to each value. For example, the data processing system may receive a set of live values of the following form

[<GUID: 07u615124, 12:00, 70.1>, <GUID: 07u615124, 12:30, 70.4>, <GUID: 07u615124, 1:00, 70.3>]

The data processing system may provide the live values to the first machine learning model. The first machine learning model may evaluate each value of the set of live values and generate a set of probabilities for different semantic data tags in a probability distribution for each individual value. The data processing system may do so using all or a portion of the values of the set of live values as inputs and using the model parameters or weights of the first machine learning model on the values. Continuing with the example above, for each value, the first machine learning model may generate an output probability distribution of the following form:

ZNT-Room-101: 80%, DAT-AHU: 10%, OAT: 10%

The probability distribution may include probabilities for any number of semantic data tags. Further, each probability may be any value.

Process 1200 is shown to include providing the data to the second machine learning model (step 1216). The data processing system can use the data points of the related time series as inputs to the second machine learning model. Similar to the data point inputs for the first machine learning model, the data point inputs for the second machine learning model may include unrecognized live values and unrecognized historical values generated by sensors of the building management system. Each time series may have one or more values. The inputs to the second machine learning model may include values that are related (e.g., that are associated with the same device identifier or have the same or similar timestamps).

For example, the data processing system may receive a set of live values including two time series having the following form Time series 1A: [<GUID: 07u615125, 5:00, Off>, <GUID: 07u615125, 6:00, Off>, <GUID: 07u615125, 7:00, On>, <GUID: 07u615125, 8:00, On>], Time series 1B: [<GUID: 07u615125, 5:00, 67>, <GUID: 07u615125, 6:00, 69.2>, <GUID: 07u615125, 7:00, 70.1>, <GUID: 07u615125, 8:00, 68.5>]

The data processing system may provide the two time series as input to the second machine learning model. The second machine learning model may use various model parameters or weights developed during training to evaluate the values of each time series in context with the values of the other time series and generate a semantic data tag probability distribution for each value of each time series. The second machine learning model may do so by using each value of the related time series as an input and using tuned model parameters or weights on the input to generate a semantic data tag for each value.

For example, the second machine learning model can identify patterns and/or relationships between the values of the related time series to determine probabilities for potential semantic data tags to associate with each value of each related time series. Continuing with the example above, the second machine learning model may generate an output of the form below for each value of time series 1A:

Supply Fan Status: 95%, Overhead Lighting: 5%
And an output of the form below for each value of time series 1B:
Discharge air temperature: 80%, Outside air temperature: 10%, Zone air temperature: 10%

The probability distribution for each time series may include probabilities for any number of semantic data tags and a probability distribution for any number of values. Further, each probability may be any value.

Process 1200 is shown to include evaluating the data according to a set of rules (step 1218). For example, step 1218 may be performed by rule-based engine 526 as described above. The data processing system can use the same time series or set of values that the data processing system used as an input to the first and/or second machine learning model as an input into a rule-based engine of the data processing system. The rule-based engine can apply a set of rules to the data to determine probabilities for potential semantic data tags. Examples of rules include, but are not limited to, a range of values that are indicative of a zone air temperature measurement, a range of values that are indicative of a supply fan status, a range of values that are indicative of a discharge air temperature measurement, and a range of values that are indicative of chilled water supply temperature. For example, the rule-based engine may receive multiple values that range from 69 to 73. The rule-based engine may compare the values to multiple rules to determine if any rules are satisfied. In this example, the rule-based engine may determine that the range of values meets a rule with criteria that states that if each value is between 68 and 75, there is an 80% chance that each value of the range of values is associated with a zone air temperature. In another example, the rule-based engine may receive a range of values of on and off. The rule-based engine may compare the values to the rules and determine that a rule related to a supply fan state is satisfied. The rule may indicate that if each value of a range of values only includes values of on and off, there is a 50% percent chance that each value is related to a supply fan status. Advantageously, by using a set of rules to determine semantic data tags for time series data in addition to using the machine learning models, a user may have more control over the final output of the data processing system. The data processing system can account for inaccuracies of the machine learning models (e.g., inaccuracies caused by overfitting during training, an untrained machine learning model, etc.).

Process 1200 is shown to include applying semantic information to the data based on the machine learning models and the set of rules (step 1220). For example, step 1220 may be performed by semantic data applicator 528 as described above. At step 1220, the data processing system can apply semantic information to the data based on the machine learning models and the set of rules. The data processing system can determine the semantic information from the outputs of the machine learning models and the set of rules. The outputs may include probabilities and probability distributions for potential semantic data tags. The data processing system can identify the probabilities and apply a second set of rules to the outputs of the machine learning models and the rule engine to determine which semantic data tag to apply to the data and whether to apply the semantic data tag. For example, the second set of rules may include rules such as selecting a semantic data tag with a highest confidence level between machine learning models, selecting a semantic data tag with a confidence score that exceeds a threshold of one or two of the machine learning models, selecting a semantic data tag if the semantic data tag has a highest confidence score in two of three of the machine learning models and the rules engine, etc. The data processing system can inform each of the machine learning models of the determined outputs to further improve the accuracy of the machine learning models.

For example, the data processing system may be configured to apply semantic data tags to values of a time series if an output probability of a semantic data tag for a value from two of the first machine learning model, the second machine learning model, and the rule-based engine exceeds an 80% threshold. The data processing system may obtain an output from the first machine learning model indicating that there is an 89% chance that a proper semantic data tag to apply to a value, or each value, of the time series is the zone air temperature. The data processing system may obtain an output from the second machine learning model indicating that there is a 49% chance that the proper semantic data tag to apply to the value, or each value, of the time series is the zone air temperature. The data processing system may obtain an output from the rule-based engine indicating that there is an 81% chance that the proper semantic data tag to apply to the value, or each value, of the time series is the zone air temperature. Because two of the three outputs have a probability for a semantic data tag that exceeds the 80% threshold, the data processing system may apply the zone air temperature semantic data tag to the value, or each value, of the time series. Advantageously, by implementing the second set of rules instead of relying on an output of one of the learning models, the data processing system may use more information to determine a semantic data tag for a time series and values of the time series and not rely on an output from one machine learning model.

In some cases, the data processing system may be implemented in a building management system that has been operating for multiple years while collecting and storing data. The data processing system may be trained with datasets of a training database that includes training data generated from tagged data of other building management systems. The data processing system can process the data of the new building management system to automatically generate and apply semantic data tags to the data so a controller and/or administrators associated with the building management system can more easily understand what the stored data is. Further, in some embodiments, the data processing system may automatically identify and tag data that is detected based on a new or modified device that is installed into the building management system without an administrator manually tagging the data.

The predicted semantic data tags that the data processing generates may be implemented in a variety of applications. A user configuring a building management system may access a user interface (e.g., user interface 900) to view the semantic data tags that are generated using the systems and methods described herein. Via the user interface, the user may view predicted semantic data tags for various values and determine whether to accept or reject the predictions. The predicted semantic data tags may be used to tag values of data generated locally and stored in a database specific to the building management system. The predicted semantic data tags may be specific to the building management system. Additionally or alternatively, the predicted semantic data tags may also be used to tag values of data that is stored in a training database. These predicted semantic data tags may be similar to the semantic data tags from other building management systems that are also stored in the training database.

Further, the semantic data tags may be used to create or update a directed graph (e.g., directed graph 1000). For example, a directed graph (e.g., in Brick Schema) including entities of a building may not include a relationship entity between a VAV box and an AHU. In the building, the AHU may feed air into the VAV box. The data processing system can predict a semantic data tag indicating that the AHU feeds air into the VAV box, generate a relationship entity associated with the semantic data tag, and add the relationship entity to the directed graph. By repeating these steps for different entities of the directed graph, the data processing system may generate and update the directed graph for the building. Similarly, using Project Haystack, the data processing system can use predicted semantic data tags to add or update entities associated with the predicted semantic data tags. For example, the data processing system may predict a semantic data tag for a discharge air temperature of an AHU based on a data time series. The data processing system may generate and/or tag a point of the AHU entity of the AHU with the discharge air temperature semantic data tag.

Additionally, the semantic data tags may be used to generate or update BACnet objects of a building. For example, based on a data timeseries and using the machine learning models, the data processing system may predict values of the data timeseries to be associated with a specific outside air temperature sensor. There may not be a BACnet object associated with the outside air temperature sensor. Consequently, the data processing system may generate a BACnet object for the outside air temperature and write the tagged values into the generated BACnet object. The data processing system may generate BACnet objects and write values into the attributes for the BACnet objects for any building device or point of the building.

The data processing system may also write values into equipment models that represent equipment of a building. The equipment models may be two-dimensional or three-dimensional renderings of building equipment of the building. The data processing system may receive values associated with the equipment represented by the equipment models and predict a semantic data tag associated with a point of the equipment. Based on the semantic data tag, the data processing system may generate a point based on the semantic data tag (e.g., a discharge air temperature sensor of an AHU) and/or write a value into the point of the equipment model. The data processing system may continuously receive data associated with equipment of the building, predict semantic data tags to associate with the data, and write values of the data into the equipment models of the equipment to keep the equipment models up-to-date.

Advantageously, the systems and methods described herein can be applied to both live data (e.g., data directly received from various building subsystems) and data already stored in a database (e.g., historical database 532). The systems and methods may provide multiple machine learning algorithms and a rule-based engine to obtain a diversity of outputs so a data processing system does not rely on any single machine learning model or engine to identify semantic data tags to associate with data. The semantic data tags can help the data that the data processing system receives be more meaningful to both a controller identifying new device configurations for building devices and to administrators viewing the data from a user device. The data processing system can become more accurate over time (e.g., be continuously trained) at identifying semantic data tags for time series and/or data points specific to the building management system that the data processing system is servicing.

The data processing system can be trained as the data processing system identifies live and historical data from the building management system, generates semantic data tags for the live data and the historical data, and accounts for any errors in the semantic data tags for future iterations of data.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for applying semantic information to data in a building management system (BMS), the method comprising:
    receiving unrecognized data from equipment associated with the BMS, the unrecognized data comprising a first value and an associated device identifier;
    providing the unrecognized data as input to a first learning model to generate a first output, the first output indicative of semantic information corresponding to the first value evaluated individually;
    providing the unrecognized data as input to a second learning model to generate a second output, the second output indicative of semantic information corresponding to the first value evaluated in context of a second value associated with the device identifier; and
    applying semantic information to the unrecognized data based on the first output and the second output.

2. The method of claim 1, wherein applying the semantic information to the unrecognized data comprises applying a tag to the first value in accordance with Brick Schema or Project Haystack.

3. The method of claim 1, wherein applying the semantic information to the unrecognized data comprises creating an entity associated with the equipment and connecting the entity to a directed graph.

4. The method of claim 1, wherein applying the semantic information to the unrecognized data comprises generating a BACnet object associated with the equipment and writing the first value to an attribute of the BACnet object.

5. The method of claim 1, further comprising presenting a user interface to a user of the BMS that allows the user to confirm the semantic information before applying the semantic information to the unrecognized data.

6. The method of claim 1, further comprising updating an equipment model associated with the equipment in the BMS using the semantic information and the first value.

7. The method of claim 1, further comprising:
    generating a first training dataset using historical data associated with the BMS, the first training dataset comprising time series with corresponding semantic information; and
    training the first learning model using the first training dataset.

8. The method of claim 1, further comprising:
    generating a second training dataset using historical data associated with the BMS, the second training dataset comprising related time series with corresponding semantic information; and
    training the second learning model using the second training dataset.

9. The method of claim 1, wherein at least one of the first output and the second output comprises a probability distribution of semantic data tags to apply to the unrecognized data.

10. The method of claim 1, further comprising evaluating the unrecognized data according to a set of rules to generate a third output and applying the semantic information to the unrecognized data based on the third output.

11. The method of claim 10, further comprising aggregating the first output, the second output, and the third output to obtain an aggregated value and comparing the aggregated value to a predetermined threshold.

12. A building management system (BMS) comprising:
    one or more computer-readable storage media having instructions stored thereon that, when executed by one or more processors, cause the one or more processors to:
        receive unrecognized data from equipment associated with the BMS, the unrecognized data comprising a first value and an associated device identifier;
        provide the unrecognized data as input to a first learning model to generate a first output, the first output indicative of semantic information corresponding to the first value evaluated individually;
        provide the unrecognized data as input to a second learning model to generate a second output, the second output indicative of semantic information corresponding to the first value evaluated in context with a second value associated with the device identifier; and
        apply semantic information to the unrecognized data based on the first output and the second output.

13. The system of claim 12, wherein the one or more processors further evaluate the unrecognized data according to a set of rules to generate a third output and apply the semantic information to the unrecognized data based on the third output.

14. The system of claim 13, wherein the one or more processors further aggregate the first output, the second output, and the third output to obtain an aggregated value and compare the aggregated value to a predetermined threshold.

15. The system of claim 12, wherein the one or more processors further apply the semantic information to the unrecognized data by applying a tag to the first value in accordance with Brick Schema or Project Haystack.

16. The system of claim 12, wherein the one or more processors further apply the semantic information to the unrecognized data by creating an entity associated with the equipment and connecting the entity to a directed graph.

17. The system of claim 12, wherein the one or more processors further apply the semantic information to the unrecognized data by generating a BACnet object associated with the equipment and writing the first value to an attribute of the BACnet object.

18. The system of claim 12, wherein the one or more processors further present a user interface to a user of the BMS that allows the user to confirm the semantic information before applying the semantic information to the unrecognized data.

19. The system of claim 12, wherein the one or more processors further update an equipment model associated with the equipment in the BMS using the semantic information and the first value.

20. A method for applying semantic information to data in a building management system (BMS), the method comprising:
    receiving unrecognized data from equipment associated with the BMS, the unrecognized data comprising a first value;
    providing the unrecognized data as input to a first learning model to generate a first output, the first output indicative of semantic information corresponding to the first value evaluated individually;
    evaluating the unrecognized data according to a set of rules to generate a second output; and
    applying semantic information to the unrecognized data based on the first output and the second output.

* * * * *